United States Patent
Ito et al.

(10) Patent No.: US 9,641,034 B2
(45) Date of Patent: May 2, 2017

(54) ROTARY MACHINE AND DRIVE SYSTEM THEREFOR

(71) Applicant: HITACHI, LTD., Tokyo (JP)

(72) Inventors: Tomomichi Ito, Tokyo (JP); Naohiro Kusumi, Tokyo (JP); Noriaki Hino, Tokyo (JP); Nobuhiro Kusuno, Tokyo (JP); Aung Kothet, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 710 days.

(21) Appl. No.: 14/049,719

(22) Filed: Oct. 9, 2013

(65) Prior Publication Data

US 2014/0111066 A1 Apr. 24, 2014

(30) Foreign Application Priority Data

Oct. 23, 2012 (JP) ................................ 2012-233334

(51) Int. Cl.
*H02M 7/48* (2007.01)
*H02K 3/12* (2006.01)
(Continued)

(52) U.S. Cl.
CPC ................ *H02K 3/12* (2013.01); *H02K 3/28* (2013.01); *H02K 11/33* (2016.01); *H02M 2001/123* (2013.01); *Y02E 10/725* (2013.01)

(58) Field of Classification Search
CPC .................................... H02K 3/12; H02P 7/48
(Continued)

(56) References Cited

U.S. PATENT DOCUMENTS 3,781,616 A * 12/1973 Mokrytzki ................ B60L 9/22
  318/801
4,509,003 A * 4/1985 Ohnishi ................... H02P 21/34
  318/800

(Continued)

FOREIGN PATENT DOCUMENTS

EP 0 888 662 A2 1/1999
JP 7-7957 A 1/1995
(Continued)

OTHER PUBLICATIONS

Extended European Search Report received in corresponding European Application No. 13189042.8 dated Oct. 21, 2016.

(Continued)

*Primary Examiner* — Bentsu Ro
(74) *Attorney, Agent, or Firm* — Mattingly & Malur, PC

(57) ABSTRACT

A rotary machine includes two sets of three-phase stator winding wires and two sets of inverters connected to the same direct-current power supply. Alternating-current terminals of the inverters are respectively connected to the three-phase stator winding wires. Stator winding wires are housed in a plurality of slots to form a stator. The two sets of three-phase stator winding wires and the stator winding wires in the same phase of the sets are started to be wound from the slot positions, with phases thereof being different from each other by 180 degrees, among the plurality of slots and are finished being wound in the slot positions, with phases thereof different from each other by 180 degrees. Winding end points of the three-phase stator winding wires are respectively connected in common, and alternating-current voltages having the same magnitude and opposite phases are applied to the two sets of three-phase stator winding wire.

15 Claims, 16 Drawing Sheets

(51) Int. Cl.
*H02K 3/28* (2006.01)
*H02K 11/33* (2016.01)
*H02M 1/12* (2006.01)

(58) Field of Classification Search
USPC .......................................... 318/599, 495–499
See application file for complete search history.

(56) References Cited

U.S. PATENT DOCUMENTS

| | | | |
|---|---|---|---|
| 5,514,944 | A | 5/1996 | Miyazaki |
| 5,650,707 | A * | 7/1997 | Lipo .................. B60L 11/1803 318/773 |
| 8,013,553 | B2 | 9/2011 | Taniguchi |
| 2003/0085683 | A1 | 5/2003 | Satake et al. |
| 2010/0071970 | A1 | 3/2010 | Welchko et al. |
| 2012/0319542 | A1 | 12/2012 | Hazeyama et al. |

FOREIGN PATENT DOCUMENTS

| | | |
|---|---|---|
| JP | 7-336971 A | 12/1995 |
| JP | 10-281151 A | 10/1998 |
| JP | 10-313596 A | 11/1998 |
| JP | 2000-50687 A | 2/2000 |
| JP | 2001-45795 A | 2/2001 |
| JP | 2003-32944 A | 1/2003 |
| JP | 2003-153585 A | 5/2003 |
| JP | 2007-104822 A | 4/2007 |
| JP | 2009-95169 A | 4/2009 |
| JP | 2011-205724 A | 10/2011 |
| JP | 2012-34451 A | 2/2012 |
| WO | 2011/039818 A1 | 4/2011 |
| WO | 2011/093202 A1 | 8/2011 |

OTHER PUBLICATIONS

Zhang, H. et al. "Multilevel Inverter Modulation Schemes to Eliminate Common-Mode Voltages", IEEE Transactions on Industry Applications, Nov. 1, 2000, pp. 1645-1653, vol. 36, No. 6, New Jersey.
Von Jouanne, A. et al., "A Dual-Bridge Inverter Approach to Eliminating Common-Mode Voltages and Bearing and Leakage Currents", IEEE Transactions on Power Electronics. Jan. 1999, pp. 43-48, vol. 14, No. 1, USA.
Japanese Office Action received in corresponding Japanese Application No. 2012-233334 dated Aug. 16, 2016.
Japanese Office Action received in corresponding Japanese Application No. 2012-233334 dated Feb. 23, 2016.
Japanese Office Action received in corresponding Japanese Application No. 2012-233334 dated Feb. 21, 2017.

* cited by examiner

ROTARY MACHINE AND DRIVE SYSTEM THEREFOR

CLAIM OF PRIORITY

The present application claims priority from Japanese application serial no. 2012-233334, filed on Oct. 23, 2012, the content of which is hereby incorporated by reference into this application.

BACKGROUND OF THE INVENTION

Field of the Invention

The present invention relates to a rotary machine configured by applying an inverter drive system to a rotary machine and a drive system for the rotary machine and, more particularly, to a rotary machine that can reduce electrical corrosion of a rotary machine bearing caused by an inverter and a drive system for the rotary machine.

Background Art

In recent years, with high control performance and an energy saving effect as a background, in many cases, rotary machine drive systems are configured by applying inverter systems to rotary machines such as an electric motor and a generator. According to the advance of an inverter series connection or parallel connection technology in recent years, it is becoming possible to drive a large-capacity rotary machine or a MW class or above.

On the other hand, a rate of change (dV/dt) of an output voltage pulse is becoming high according to a loss reducing technology for an inverter. Therefore, the problem of electrical corrosion of a rotary machine bearing cannot be ignored.

As measures against the electrical corrosion, there have been proposed, for example, a method of avoiding electrical contact by adopting a magnetically-levitated bearing, a method of applying ceramics to a bearing rather than metal, and a method of inserting a common mode filter between an inverter and a rotary machine. As an example of the measures, in Japanese Patent No. 4260110, electrical corrosion is prevented by inserting the common mode filter.

However, in the existing system, a rotary machine of a MW class or above has large rotor weight. Therefore, the size of the structure of the magnetic bearing increases, it is difficult to manufacture ceramics that can withstand the weight, and the size of the system increases because of the insertion of the common mode filter through which large electric power passes.

SUMMARY OF THE INVENTION

The present invention has been devised in view of the circumstances and it is an object of the present invention to provide a rotary machine that can prevent electrical corrosion of a bearing while avoiding an increase in the size of a drive system and the drive system for the rotary machine.

Therefore, in a rotary machine according to the present invention, stator winding wires are housed in a plurality of slots to form a stator, two sets of three-phase stator winding wires are provided and the stator winding wires in the same phase of the sets are started to be wound from slot positions, phases of electric angles of which are different from each other by 180 degrees, among the plurality of slots and finished being wound in slot positions, phases of electric angles of which are different from each other by 180 degrees, winding end points of the three-phase stator winding wires of the sets are respectively connected in common, and alternating-current voltages having the same magnitude and opposite phases are applied to the two sets of three-phase stator winding wires.

A drive system for a rotary machine according to the present invention is a drive system for a rotary machine including: a rotary machine including two sets of three-phase stator winding wires; and two sets of inverters connected to the same direct-current power supply, alternating-current terminals of the two sets of inverters being respectively connected to the three-phase stator winding wires of the sets. In the rotary machine, stator winding wires are housed in a plurality of slots to form a stator, the two sets of three-phase stator winding wires are provided and the stator winding wires in the same phase of the sets are started to be wound from the slot positions, phases of electric angles of which are different from each other by 180 degrees, among the plurality of slots and finished being wound in the slot positions, phases of electric angles of which are different from each other by 180 degrees, winding end points of the three-phase stator winding wires of the sets are respectively connected in common, and alternating-current voltages having the same magnitude and opposite phases are applied to the two sets of three-phase stator winding wires.

With the configuration of the present invention, a zero-phase sequence current output by a single inverter is offset by a zero-phase sequence current output by the other single inverter. As a result, it is possible to reduce an electric current flowing through a bearing.

DETAILED DESCRIPTION OF THE INVENTION

Embodiments of the present invention are explained below with reference to the drawings.

In a rotary machine and a drive system for the rotary machine according to a first embodiment of the present invention, first, the rotary machine is a synchronous machine and includes two sets of two-level three-phase stator winding wires, neutral points of which are insulated. The drive system for the rotary machine includes two sets of two-level three-phase inverters. The drive system is configured to give phase-inverted voltages to the two sets of three-phase stator winding wires of the synchronous machine. Therefore, as an example, there is a configuration in which phase-inverted two triangular waves, as carriers, are given to input terminals of the two sets of two-level three-phase inverters to drive the inverters. With this configuration, it is possible to reduce a zero-phase sequence current of a synchronous bearing.

In a rotary machine and a drive system for the rotary machine according to a second embodiment of the present invention, a drive system inverter of the rotary machine is a three-level inverter. Since the three-level inverter is adopted, in addition to an effect of preventing electrical corrosion of a bearing, it is possible to cancel a ripple component of a direct-current mid-point current, eliminate the need for complicated control for mid-point potential fixing and a large-capacity direct-current capacitor, and simplify the system and reduce the size of the system.

First Embodiment

Figure 1:
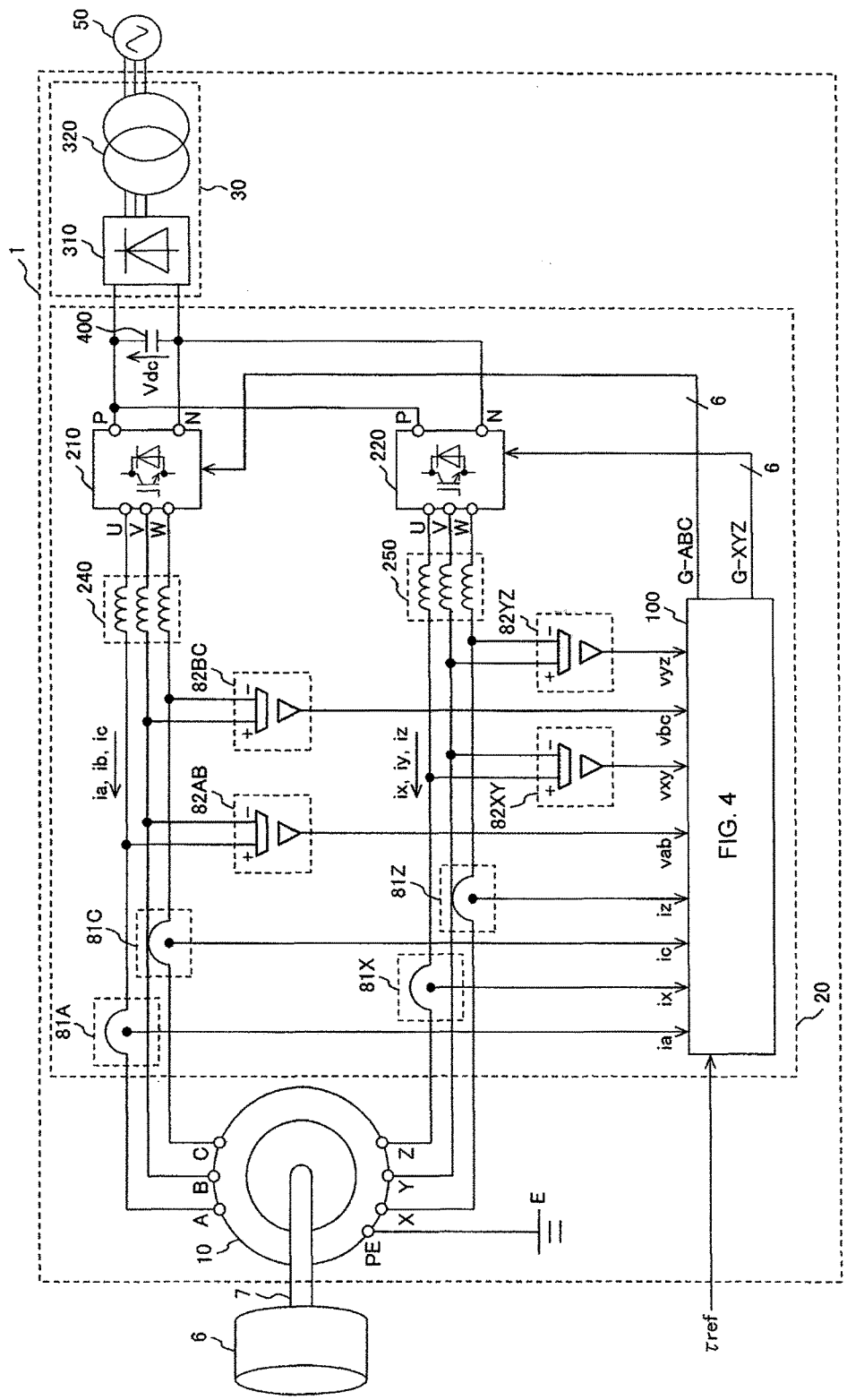
FIG. 1 is a diagram showing an overall configuration of a rotary machine drive system according to a first embodiment of the present invention.

The first embodiment of the present invention is explained with reference to FIG. 1. In FIG. 1, a rotary machine drive system 1 for a rotary machine, which is a synchronous machine. In an example shown in the figure, the synchronous machine is a synchronous electric motor. However, the synchronous machine may be a synchronous generator.

The rotary machine drive system 1 shown in FIG. 1 roughly includes a rectifier 30, an inverter system 20, and a synchronous machine 10. A power system 50 is linked to the rotary machine drive system 1. Torque is generated in a rotor (a shaft) 7 of the synchronous machine 10 by the inverter system 20 of the rotary machine drive system 1. The torque is transmitted to a load 6.

In the example shown in FIG. 1, the synchronous electric motor is intended. Therefore, since electric power is given from the power system 50 in the direction of the synchronous electric motor 10, the rectifier 30 is set. Therefore, when the synchronous generator is adopted as the synchronous machine, an inverter only has to be provided instead of the rectifier 30 to send electric power from the generator to a power system.

With the synchronous electric motor in mind, the configurations and the functions of the components of the rotary machine drive system 1 are explained below in order from the component closest to the power system 50.

First, the rectifier 30 includes a transformer 320 provided for the purpose of electrical insulation and voltage conversion for the power system 50 and a diode rectifier 320 connected to the transformer 320 and configured to convert input alternating-current power into direct-current power. The rectifier 30 rectifies alternating-current power received by the power system 50 into a direct current and supplies direct-current power to the inverter system 20.

The inverter system 20 is explained. The inverter system 20 includes a power main circuit and a controller for the power main circuit. The power main circuit includes two-level inverters 210 and 220 to which direct-current input terminals P and N are connected in parallel, filter reactors 240 and 250, and a direct-current capacitor 400. For the purpose of reducing pulsation of the direct-current power output by the rectifier 30, the direct-current capacitor 400 is connected to a direct-current circuit configured to connect the rectifier 30 and the inverters 210 and 220.

The synchronous machine 10 includes two sets of three-phase stator winding wires, a power earth terminal PE of which is connected to an earth point E and insulated. The three-phase stator winding wires of the sets are respectively connected to the inverters 210 and 220 to receive power feed from the inverters 210 and 220. The rotor (the shaft) 7 of the synchronous machine 10 is connected to the load 6. A connection relation between the two sets of three-phase stator winding wires of the synchronous machine 10 is explained below with reference to FIG. 3.

The controller of the inverter system 20 includes a controller 100 and an input/output circuit section for the controller 100. The inverters 210 and 220 are controlled by a gate signal G given by the controller 100.

The controller 100 detects output currents i of the inverters 210 and 220 with current sensors 81A, 81C, 81X, and 81Z. The controller 100 detects output voltages v of the inverters 210 and 220 with voltage sensors 82AB, 82BC, 82XY, and 82YZ. The controller 100 receives detection values of the output currents i and the output voltage v as inputs.

In the following illustration and explanation, signs are affixed according to the following rules. All alternating-current side terminals of the two-level inverters 210 and 220, to which the direct-current input terminals P and N are connected in parallel, are written in U, V, and W phases. However, in some case, quantities of electricity treated by the alternating-current side terminals U, V, and W of the two-level inverter 210 and the alternating-current side terminals U, V, and W of the two-level inverter 220 are desirably distinguished for explanation. Therefore, in the following explanation, the electric current i and the voltage v on the inverter 210 side are denoted by A, B, and C or a, b, and c to distinguish phases and line-to-line voltages. The electric current i and the voltage v on the inverter 220 side are denoted by X, Y, and Z or x, y, and z to distinguish phases and line-to-line voltages.

In the illustration of FIG. 1, concerning the electric currents i, only electric currents of two phases (in the figure, ia and is on the inverter 210 side and ix and iz on the inverter 220 side) among the three phases are input to the controller 100. Concerning the voltages v, only two line-to-line voltages (in the figure, vab and vbc on the inverter 210 side and vxy and vyz on the inverter 220 side) among three line-to-line voltages are input to the controller 100. Since electric currents ib and iy of the remaining one phase and the remaining one line-to-line voltages vca and vzx can be calculated by combination, the configuration of the input circuit section is simplified. The electric currents and the line-to-line voltages are treated as three-phase amounts in the controller 100.

Figure 4:
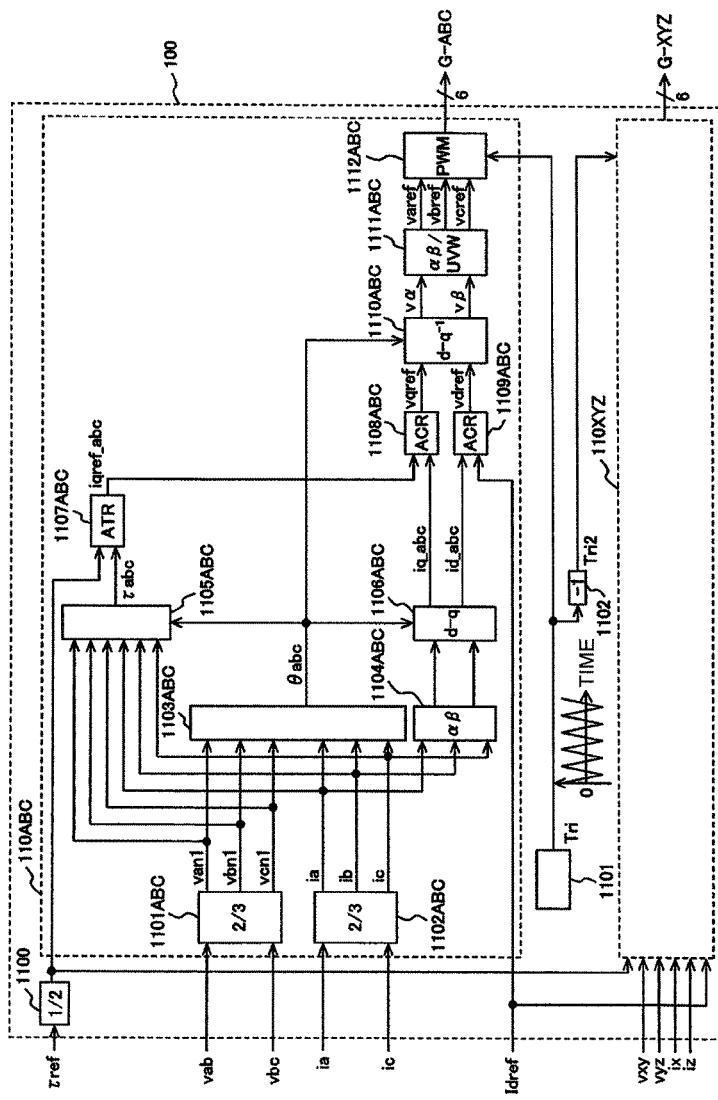
FIG. 4 is a diagram showing the configuration of an inverter controller shown in FIG. 1.

Detailed arithmetic operation content of the controller 100 is explained below with reference to FIG. 4. The controller 100 calculates gate signals G of the two-level inverters 210 and 220 such that a torque command τref and output torque to the synchronous machine 10 coincides with each other and outputs the gate signals G respectively to the two-level inverters 210 and 220. A gate signal G-ABC given to the two-level inverter 210 and a gate signal G-XYZ given to the two-level inverter 220 are distinguished by the signs A, B, and C or the signs X, Y, and Z explained above and displayed.

The configuration of the two-level inverter 210 is explained with reference to FIG. 2. Since the configuration of the two-level inverter 220 is the same as the configuration of the two-level inverter 210, only the two-level inverter 210 is explained. In the two-level inverter 210, an arm configured by connecting two IGBT elements in series is formed for each of phases. The two-level inverter 210 includes three arms.

IGBT elements 210$m$, 210$n$, 210$o$, 210$p$, 210$q$, and 210$r$ include IGBTs and diodes connected to the IGBTs in antiparallel. The gate signal G-ABC output from the controller 100 to the two-level inverter 210 is input to gates, which are control electrodes, of the IGBT elements 210$m$, 210$n$, 210$o$, 210$p$, 210$q$, and 210$r$ and the IGBTs are controlled to be turned on and off.

When the gate signal G is "0", the IGBT element is turned off. When the gate signal G is "1", the IGBT element is turned on. The two-level inverter 210 adjusts a time ratio of ON and OFF of the IGBT elements to thereby output an alternating-current voltage including a harmonic component to the alternating-current terminals U, V, and W. The reactors 240 and 250 shown in FIG. 1 are provided to suppress a harmonic current flowing into the synchronous machine 10 according to voltage harmonics.

Figure 3:
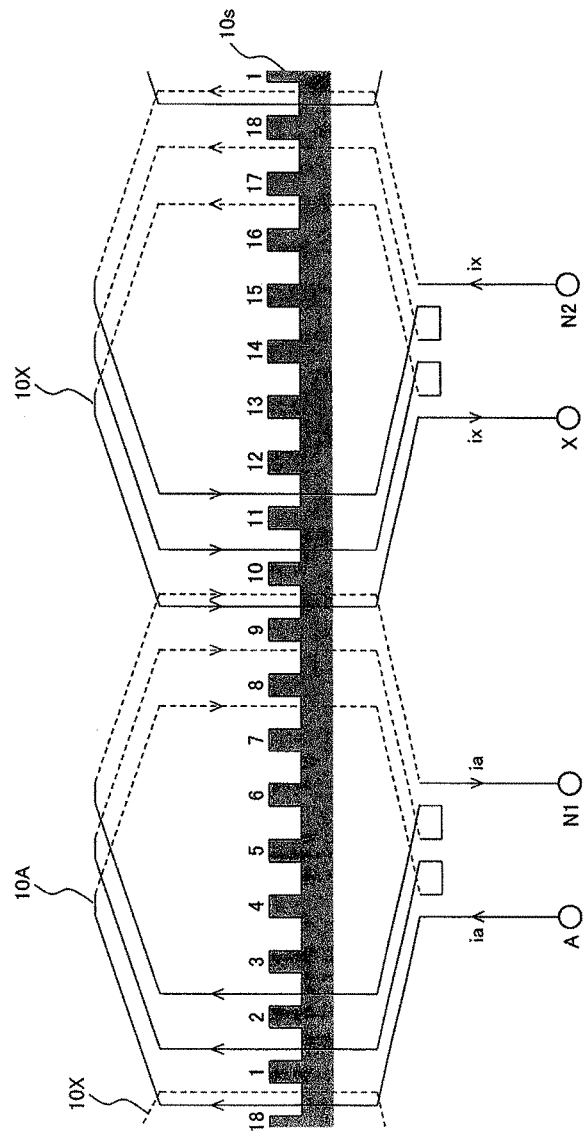
FIG. 3 is a diagram showing stator winding wire binding of a synchronous machine shown in FIG. 1.

The configuration of the synchronous machine 10 is explained with reference to FIG. 3. In FIG. 3, a stator winding wire binding diagram for 360 degrees of an electric angle of the synchronous machine 10 is shown. The synchronous machine 10 is a bipolar machine of a star winding wire. Only stator winding wires 10A and 10X in the A phase and the X phase are shown in FIG. 3. As it is evident from the explanation of the rules for affixing the signs to the alternating-current terminals of the two sets of two-level inverters 210 and 220 shown in FIG. 1, this describes only stator winding wires for a U-phase alternating-current terminal. Numbers 1 to 18 described in upper parts of a slot 10$s$ indicate slot numbers.

As shown in the figure, the stator winding wire 10A in the A phase is connected from a terminal A to a terminal N1 via the slot numbers 1, 8, 2, 9, 3, and 10 in this order. The stator winding wire 10X is connected from a terminal X to a terminal N2 via the slot numbers 10, 17, 11, 18, 12, and 1 in this order.

According to this winding method, a stator winding wire for the terminal A among two sets of stator winding wires of a U-phase stator winding wire is started to be wound from the slot number 1 and a stator winding wire for the terminal X is started to be wound from the slot number 10. This means that the two sets of stator winding wires in the same phase are wound starting from slot positions, phases of which are different from each other by 180 degrees, and finished winding in slot positions, phases of which are different from each other by 180 degrees.

Although not shown in the figure, the synchronous machine 10 includes two sets of three-phase stator winding wires for each of the V phase and the W phase. Concerning the V phase, a stator winding wire 10B in the B phase is started to be wound from the slot number 7 shown in FIG. 3. A stator winding wire 10Y in the Y phase is started to be wound from the slot number 16. Similarly, concerning the W phase, a stator winding wire 10C in the C phase is started to be wound from the slot number 13. A stator winding wire 10Z in the Z phase is started to be wound from the slot number 4. In these phases, two sets of stator winding wires in the same phase are started to be wound in slot positions, phases of which are different from each other by 180 degrees, and finished winding in slot positions, phases of which are different by 180 degrees.

It goes without saying that the U, V, and W phases are arrayed in slot positions having a phase difference of 120 degrees. The winding ends of the three-phase alternating-current stator winding wires of the sets are bound to, for example, the neutral point terminal N1 in the case of the phases A, B, and C and bound to the neutral point terminal N2 in the case of the phases X, Y, and Z to form a star connection. The neutral point terminal N1 and N2 are insulated each other.

In the rotary machine according to the present invention, the stator winding wires are bound to satisfy the relation. In the present invention, for the synchronous machine having such a wiring wire structure, the inverter system 20 controls the electric current ia flowing from the terminal A to the terminal N1 and the electric current ix flowing from the terminal X to the terminal N2 such that phases thereof are different by 180 degrees as explained below. In FIG. 3, the directions of an electric current flowing to the stator winding wires 10A and 10X when the electric currents ia and ix are controlled in this way is shown for each of the stator winding wires.

By applying the inversion current, for example, when the electric current ia flows in from the terminal A and flows out to the terminal N1 via slot numbers 1, 8, 2, 9, 3, and 10 in this order, the electric current ix flows in from the terminal N2 and flows out to the terminal X via the slot numbers 1, 12, 18, 11, 17, and 10 in this order.

Figure 16:
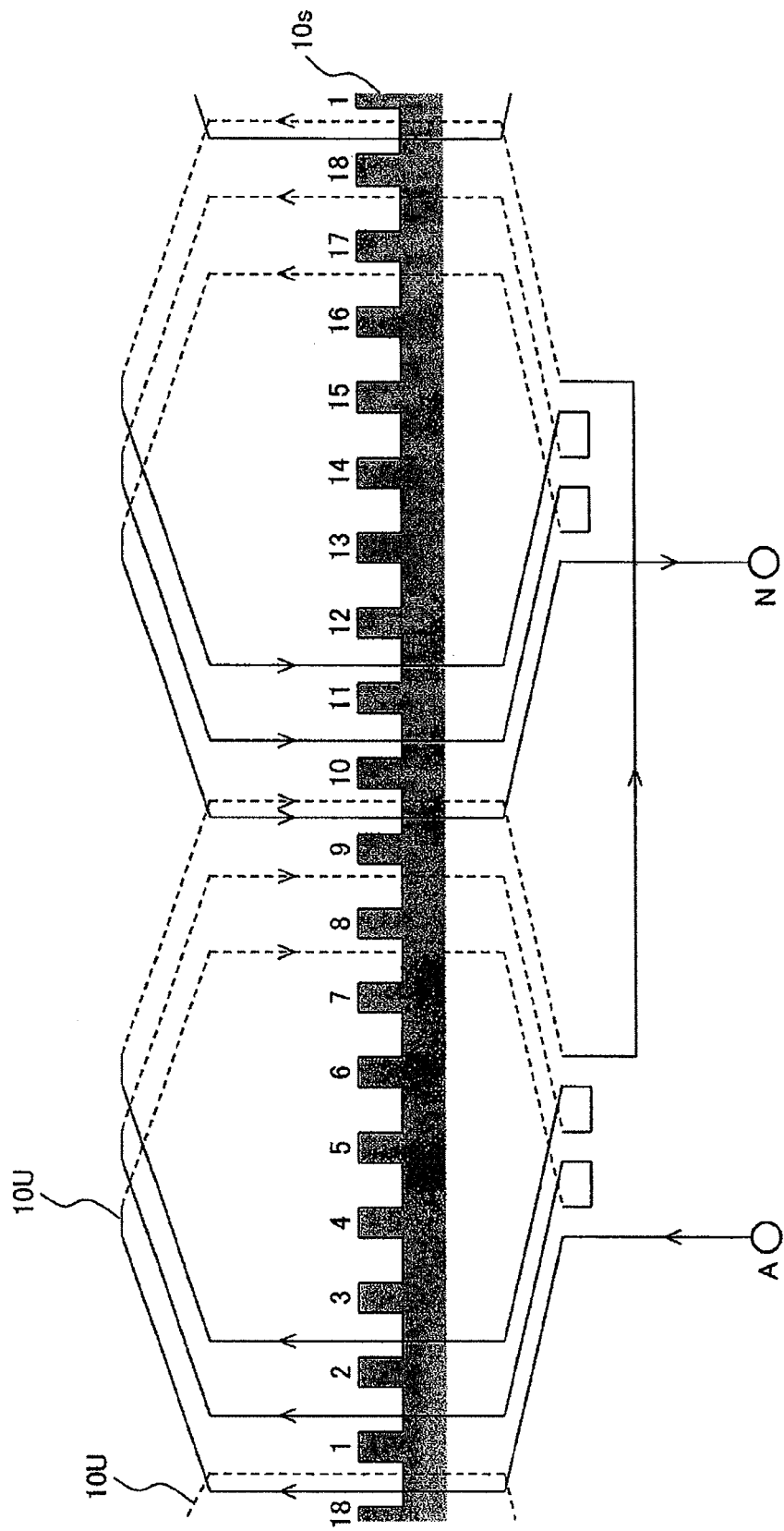
FIG. 16 is a diagram showing stator winding wire binding of a synchronous machine in the past.

As a reference for comparison, a stator winding wire binding diagram of a star connection bipolar synchronous machine in the past is shown in FIG. 16. After flowing to the slot numbers 1, 8, 2, 9, 3, and 10 in this order through a stator winding wire 10U, an electric current input from the terminal A follows the slot numbers 1, 12, 18, 11, 17, and 10 in this order and flows to the terminal N. As a result, in FIGS. 3 and 16, current directions of the stator winding wires are the same.

As shown in this structure, the synchronous machine 10 includes the two sets of three-phase stator winding wires, the power earth terminal PE of which is insulated. Consequently, voltages, phases of which are different by 180 degrees, are induced in the stator winding wires 10A and 10X of the rotor of the rotary machine 10. As a result, it is possible to form a space magnetic flux same as a space magnetic flux of the bipolar synchronous machine in the past.

The controller 100 is explained with reference to FIG. 4. The controller 100 includes a controller 110ABC for the two-level inverter 210, a controller 110XYZ for the two-level inverter 220, a torque distributor 1100, and a PWM carrier generator 1101. The controller 100 controls, with the two controllers 110ABC and 110XYZ, the electric current ia flowing from the terminal A to the terminal N1 and the electric current ix flowing from the terminal X to the terminal N2 in FIG. 3 such that phases thereof are different by 180 degrees.

Inputs given to the controllers 110ABC and 110XYZ are explained. Since the function of the controllers 110ABC and 110XYZ are torque control, one of the inputs is a torque command τref. The torque command τref is divided into a half by the torque distributor 110 and input to the controllers 110ABC and 110XYZ in common. Therefore, the two controllers 110ABC and 110XYZ operate according to the torque command τref having the same value.

Since it is necessary to derive actual torque corresponding to the torque command τref, detection values of the voltage sensors and the current sensors are obtained. For the torque calculation, as shown in FIG. 1, concerning the electric current i, the electric currents ia and is are used in the controller 110ABC and the electric currents ix and iz are used in the controller 110XYZ. Concerning the voltage v, the voltages vab and vbc are used in the controller 110ABC and the voltages vxy and vyz are used in the controller 110XYZ.

As other inputs, a d-axis current command value Idref for vector control in the controllers 110ABC and 110XYZ and a carrier signal Tri for determining ignition timing are used.

The controllers 110ABC and 110XYZ obtain, from a two-phase/three-phase converter 1111ABC, alternating-current output voltage command values varef, vbref, and vcref of the inverters 210 and 220 calculated on the basis of the signals such that torque given to the rotor of the synchronous machine 10 by the inverters 210 and 220 and the divided torque command τref/2 coincide with each other.

A PWM operator 1112ABC compares the magnitude of the calculated alternating-current output voltage command values varef, vbref, and vcref with the magnitude of the carrier signal Tri, which is an output of the carrier generator 1101. Consequently, gate signals G-ABC and G-XYZ in which an instantaneous average value of inverter output voltages coincides with the voltage command values are calculated.

A specific calculation method is explained with reference to the drawings. The controller 110ABC and the controller 110XYZ have the same circuit configuration and include the same operator. Therefore, the controller 110ABC is explained as an example.

First, the voltage detection values vab and vbc are input to a two-phase/three-phase operator 1101ABC and converted into phase voltages Van1, Vbn1, and Vcn1 of three phases. Since a calculation in the two-phase/three-phase operator 1101ABC can be carried out by a publicly-known method, detailed explanation of the calculation is omitted. Similarly, the current detection values ia and ib are input to a two-phase/three-phase operator 1102ABC and converted into three-phase currents ia, ib, and ic.

The voltage detection values Van1, Vbn1, and Vcn1 and the current detection values ia, ib, and ic converted into three phases are input to a phase calculator 1103ABC and a stator winding wire induced voltage phase of the synchronous machine 10 is calculated. Specifically, the phase calculator 1103ABC estimates an induced voltage from an input current of the synchronous machine 10 and a synchronous machine impedance and an input terminal voltage, which are known values, and calculates a phase θabc of the voltage. Consequently, the phase calculation is realized. This calculation is a phase detecting method well known in the field. Therefore, detailed explanation of the calculation is omitted.

A torque calculator 1105ABC receives the induced voltage phase calculated value θabc and the terminal voltages Van1, Vbn1, and Vcn1 and the input currents ia, ib, and ic of the synchronous machine 10 converted into three phases and calculates a torque Tabc applied to the rotor of the synchronous machine 10 by the two-level inverter 210.

A torque compensator 1107ABC receives the output of the torque distributor 1100 (the torque command τref/2) and the actual torque τabc, calculates a torque current command value (a q-axis current command value of vector control) iqref_abc to reduce a deviation between the output and the actual torque τabc, and outputs the torque current command value iqref_abc to a current controller 1108ABC. In the vector control, a d-axis current is simultaneously adjusted. The d-axis current command value Idref is given to a current controller 1109ABC from the outside.

A q-axis current iq_abc which is a torque current and a d-axis current id_abc which is a reactive current, used in the current controllers 1108ABC and 1109ABC respectively, are calculated as explained below. First, the input currents ia, ib, and is are input to an α-β operator 1104ABC. The α-β operator 1104ABC subjects the input three-phase value to α-β conversion and outputs a converted value to a d-q converter 1106ABC.

The d-q converter 1106ABC subjects the α-β converted value of the input currents to d-q conversion using the phase calculated value θabc, calculates the torque current iq_abc and the reactive current id_abc, and outputs the torque current iq_abc and the reactive current id_abc to the current controllers 1108ABC and 1109ABC.

The current controller 1108ABC calculates a q-axis output voltage command value vqref of the two-level inverter 210 such that the torque current command iqref_abc and the torque current iq_abc coincide with each other. The current controller 1109ABC calculates a d-axis output voltage command value vdref of the two-level inverter 210 such that a reactive current command value idref, which is zero, and the reactive current id_abc coincide with each other.

After being subjected to α-β conversion by a d-q inverter 1110ABC, the voltage command values vdref and vqref are converted into three phases by the two-phase/three-phase converter 111ABC. Three-phase voltage command values varef, vbref, and vcref are output to a PWM operator 1112ABC.

Consequently, the two-level inverter 210 is controlled to generate torque that coincides with a torque command. On the other hand, the controller 110XYZ carries out an arithmetic operation same as the arithmetic operation of the controller 110ABC. That is, the controller 110XYZ calculates, using the voltage detection values vxy and vyz and the current detection values ix and iy, a gate signal of the two-level inverter 220 such that an output of the torque command distributor 1100 and torque applied to the rotor of the synchronous machine 10 by the two-level inverter 220 coincide with each other.

The controller 110XYZ is different from the controller 110ABC in that the carrier Tri is phase-inverted by the multiplier 1102 and in that voltage phases induced in the X phase, the Y phase, and the Z phase of the synchronous machine 10 are inverted into the A phase, the B phase, and the C phase.

It is possible to cancel an electric current flowing to a rotary machine bearing as explained below according to the phase inversion of the carrier and the phase inversion of the induced voltage. As a result, it is possible to reduce electrical corrosion. An electrical corrosion prevention principal of the synchronous machine 10 in this embodiment is explained with reference to FIGS. 5, 6, and 7.

Figure 5:
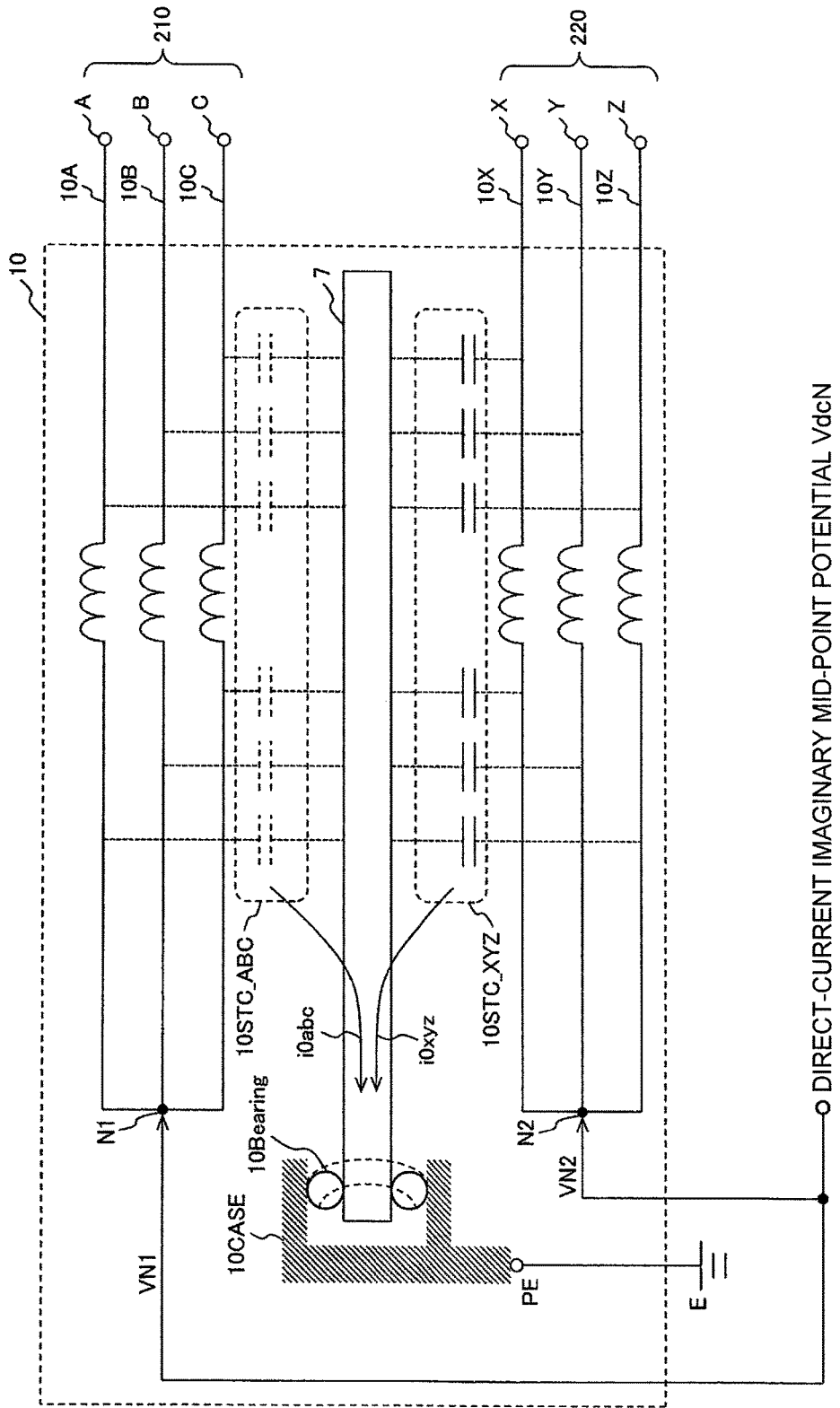
FIG. 5 is a schematic diagram of the synchronous machine shown in FIG. 3.

In FIG. 5, a schematic diagram of the synchronous machine 10 wire-bound as shown in FIG. 3 is shown. On the side of the two-level inverter 210, the terminals A, B, and C are connected to stator winding wires 10A, 10B, and 10C in the synchronous machine 10 and bound in the terminal N1. On the side of the two-level inverter 220, the terminals X, Y, and Z are connected to the stator winding wires 10X, 10Y, and 10Z in the synchronous machine 10 and bound in the terminal N2.

A phenomenon explained below indicates the same event in the two sets of stator winding wires (10A, 10B, and 10C and 10X, 10Y, and 10Z). Therefore, the stator winding wires 10A, 10B, and 10C on the two-level inverter 210 side are explained as an example. Stray capacitance 10STC_ABC is present between the stator winding wires 10A, 10B, and 10C and the shaft 7 of the synchronous machine 10. Similarly, stray capacitance 10STC_XYZ is present between the stator winding wires 10X, 10Y, and 10Z and the shaft 7 of the synchronous machine 10.

A pulse-like voltage is applied to the terminals A, B, and C (the terminals X, Y, and Z) by the two-level inverter 210 (220). When the applied voltage changes in a pulse-like manner, the stray capacitances 10STC_ABC and 10STC_XYZ are charged and discharged. A sum of electric currents flowing via the stray capacitances 10STC_ABC and 10STC_XYZ (a zero-phase sequence current) flows to the earth E via a bearing 10Bearing, a bearing case 10CASE, and the power earth terminal PE.

The electric current flowing into the earth returns to the two-level inverters 210 and 220 via not-shown earth stray capacitances of the two-level inverters 210 and 220 or not-shown earth stray capacitance of the transformer 320 in the rectifier 30. As the earth current flowing through the bearing and the like is larger, it is more difficult to ignore the problem of electrical corrosion of the rotary machine bearing.

The stray capacitances 10STC_ABC and 10STC_XYZ can be substantially equalized by equalizing the numbers of windings of the stator winding wires 10A, 10B, and 10C and the stator winding wires 10X, 10Y, and 10Z.

In the configuration shown in FIG. 5, a bearing current i0*abc* flows according to a difference voltage VN1 between a virtual neutral point at the DC-link circuit VdcN, which is a potential obtained by equally dividing a direct-current circuit voltage of the inverter system 20 into two, and the potential of the neutral point N1 of the stator winding wires 10A, 10B, and 10C (a zero phase-component of a voltage applied to the terminals A, B, and C). Similarly, an electric current i0*xyz* flowing to the bearing via the inverter 220 flows according to a difference voltage VN2 between a virtual neutral point at the DC-link circuit Vdc and the potential of the neutral point N2 of the stator winding wires 10X, 10Y, and 10Z (a zero phase-voltage of a voltage applied to the terminals X, Y, and Z).

Waveforms of the difference voltages VN1 and VN2 are explained with reference to FIG. 6. The abscissa of a graph shown in FIG. 6 indicates time. The carrier Tri and the alternating-current voltage command values varef, vbref, and vcref of the two-level inverter 210 are shown in the top section of the figure. In an example shown in the figure, whereas the carrier Tri of a triangular wave repeats an increase and a decrease at a substantially fixed period, absolute values of varef and vbref decrease as time elapses and an absolute value of vcref increases as time elapses. Here, varef takes a positive value and vbref and vcref take negative values.

Figure 6:
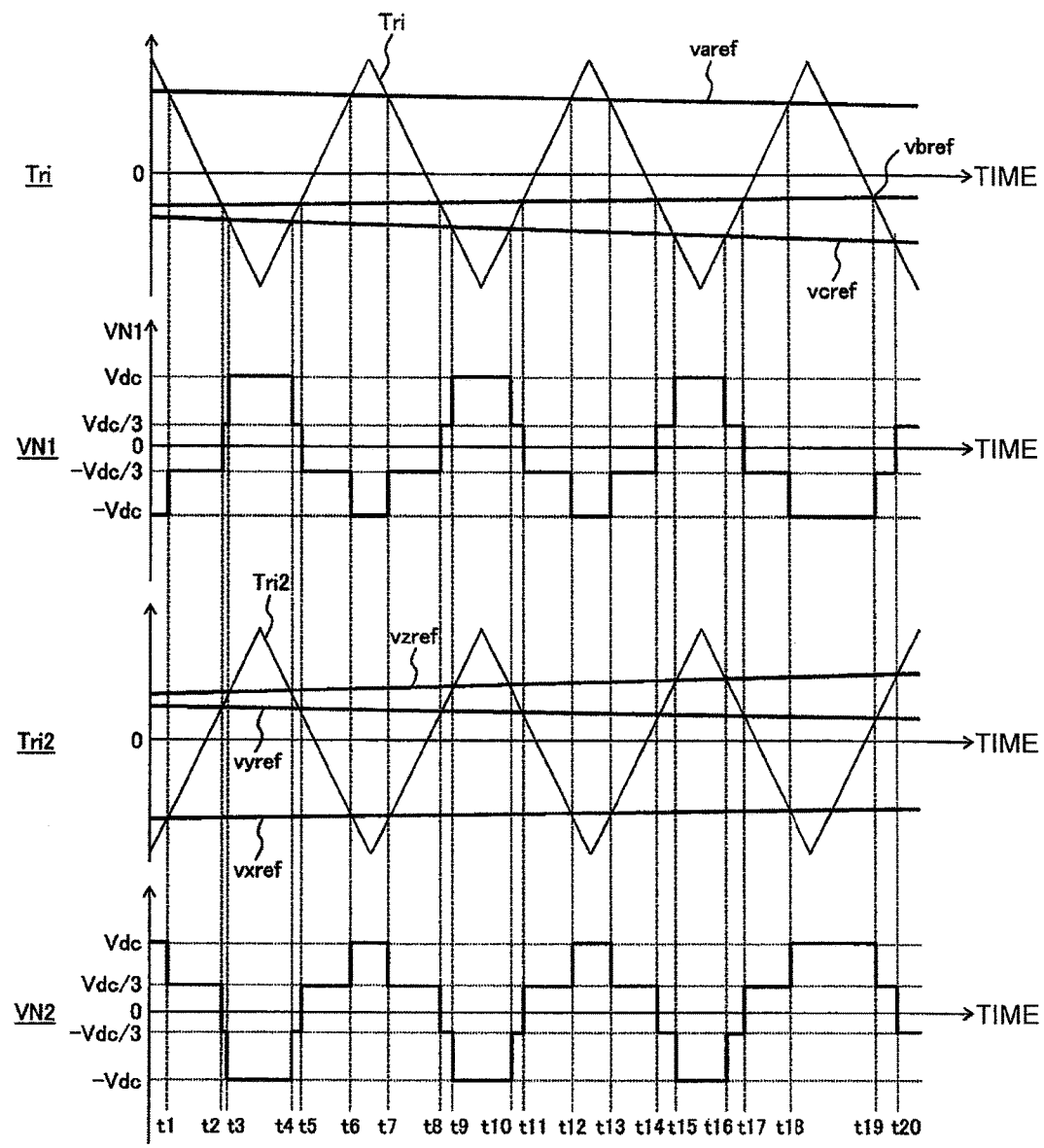
FIG. 6 is a diagram showing waveforms of difference voltages VN1 and VN2 obtained by the two-level inverter.

On the other hand, a carrier Tri2 calculated by phase-inverting the carrier Tri and alternating-current voltage command values vxref, vyref, and vzref of the two-level inverter 220 are shown in the third section from the top of the graph shown in FIG. 6. The carrier Tri2 of a phase-inverted triangular wave repeats an increase and a decrease at a substantially fixed period. The alternating-current voltage command values vxref, vyref, and vzref are respectively obtained by positive-negative inverting the alternating-current voltage command values varef, vbref, and vcref of the two-level inverter 210. Here, vxref corresponding to varef takes a negative value and vyref corresponding to vbref and vzref corresponding to vcref take positive values. In the example shown in the figure, absolute values of vxref and vyref decrease as time elapses and an absolute value of vzref increases as time elapses.

Figure 2:
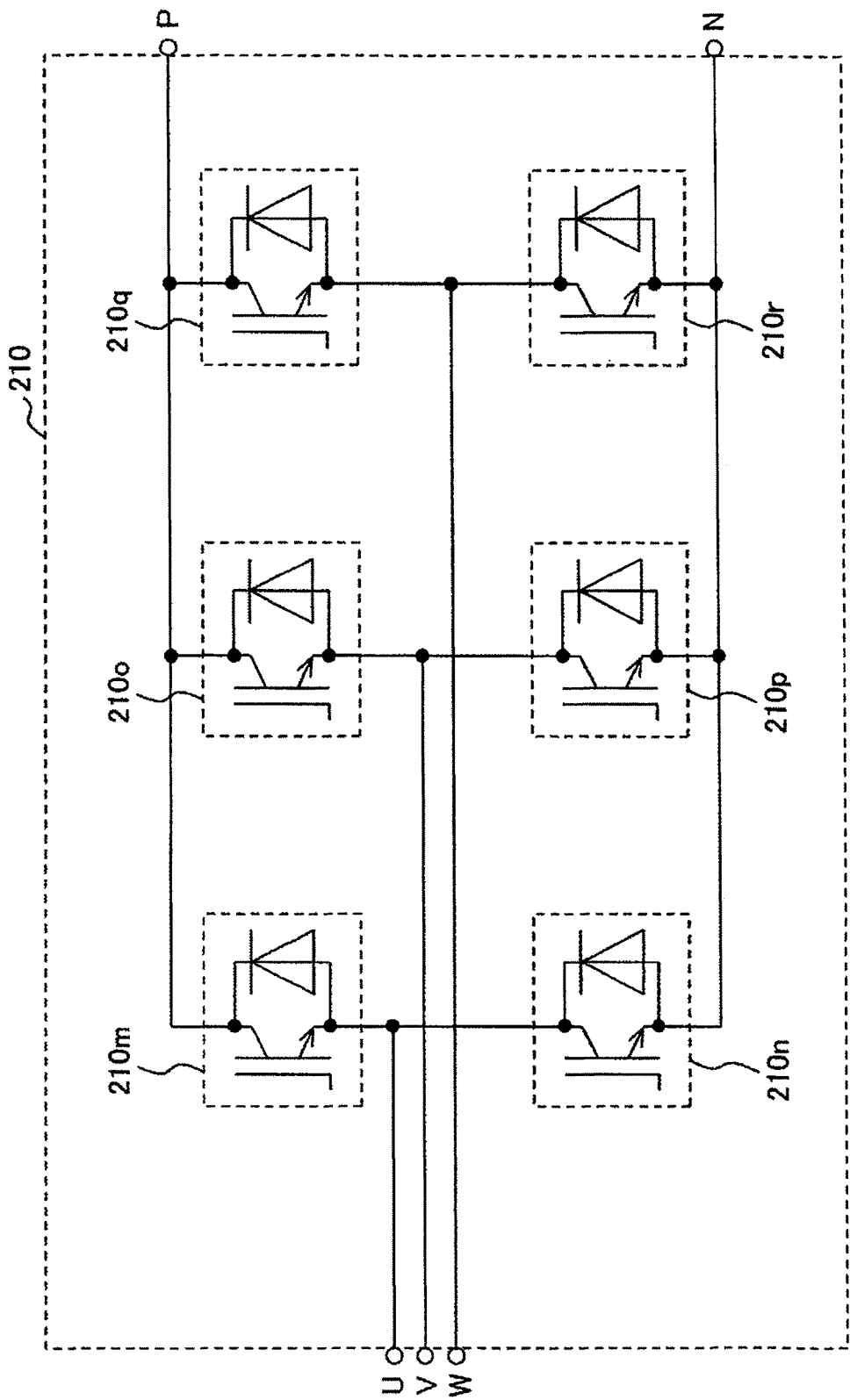
FIG. 2 is a diagram showing the configuration of a two-level inverter 210 shown in FIG. 1.

According to comparison of the alternating-current voltage command values and the carriers for the respective phases, ignition timings for the IGBT elements 210*m*, 210*n*, 210O, 210P, 210*q*, and 210*r* shown in FIG. 2 are determined at times t1 to t20 when the alternating-current voltage command values and the carriers cross. For example, the IGBT element is ignited and generates a voltage at an alternating-current terminal when the carrier is equal to or lower than the alternating-current voltage command value.

The ignition timings for the IGBT elements are determined according to the comparison of the alternating-current voltage command values and the carriers for the respective phases. As a result, alternating-current voltages of the phases obtained in the alternating-current side terminals change. Zero-phase voltages set by the alternating-current voltages in the three phases in this case are shown in the second and fourth sections from the top of the graph shown in FIG. 6. The zero-phase voltages are represented by the difference voltages VN1 and VN2 between the virtual neutral point at the DC-link circuit Vdc shown in FIG. 5 and the potentials of the neutral points N1 and N2 of the stator winding wires. As shown in FIG. 6, the difference voltages VN1 and VN2 are in opposite phases each other.

In the waveforms shown in FIG. 6, the alternating-current voltage command values varef, vbref, and vcref and vxref, vyref, and vzref are symmetrical with respect to the zero point. This is because, in the power main circuit configuration shown in FIG. 1, it is possible to satisfy conditions that, for example, total inductance from the two-level inverter 210 including the filter 240 to the synchronous machine 10 and total inductance from the two-level inverter 220 including the filter 240 to the synchronous machine 10 can be substantially equalized and, in this case, the torque command τref to the two-level inverter 210 and 220 explained with reference to FIG. 4 can be equalized, and, then, the numbers of windings of the stator winding wires 10A, 10B, and 10C and the stator winding wires 10X, 10Y, and 10Z can be equalized, and the phases of induced voltages induced in the stator winding wires are different by 180 degrees can be satisfied.

When these conditions are satisfied, the zero-phase voltages VN1 and VN2 are respectively equal to average values of voltages a the terminals A, B, and C and the terminals X, Y, and Z.

The phases of the carriers Tri and Tri2 are inverted and the voltage command values are also inverted. Therefore, the difference voltages VN1 and VN2 have positive-negative symmetrical waveforms.

Since all the numbers of windings of the stator winding wires of the synchronous machine 10 are equal, the stray capacitances 10STC_ABC an 10STC_XYZ have substantially equal values and the applied voltages VN1 and VN2 are also positive-negative symmetrical. Therefore, waveforms of the electric currents i0*abc* and i0*xyz* flowing through the bearing are also positive-negative symmetrical and an electric current flowing to the bearing is substantially offset. Since electrical corrosion is an event caused by an electric current flowing to the bearing, as a result, according to this embodiment, electrical corrosion of the bearing can be prevented.

Figure 7:
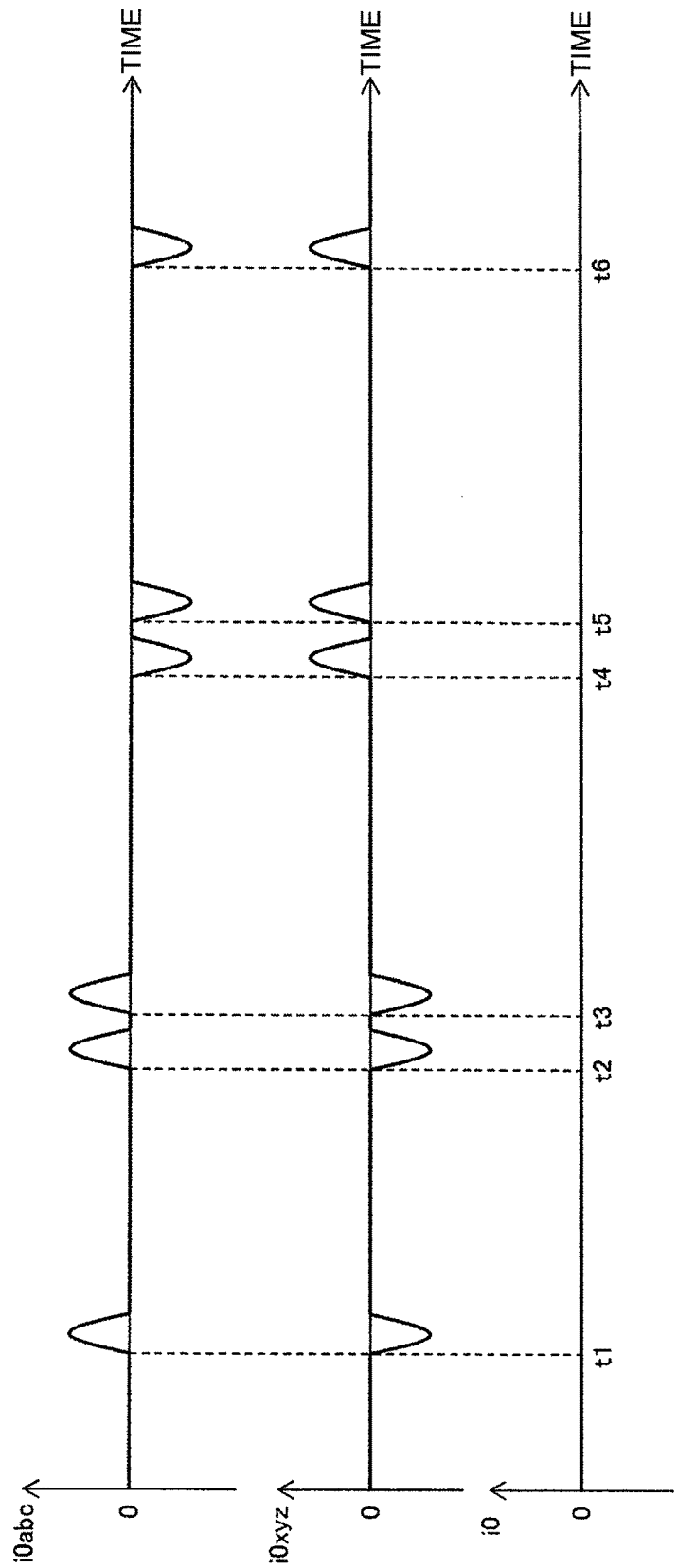
FIG. 7 is a diagram showing waveforms of electric currents i0abc and i0xyz flowing through a bearing.

In FIG. 7, the abscissa indicates time and the ordinate indicates waveforms of the electric currents i0abc and i0xyz flowing through the bearing. FIG. 7 indicates that the waveforms are positive-negative symmetrical and the electric current i0 flowing to the bearing is substantially offset.

To sufficiently attain the effect explained above, it is desirable to taken into account the following points. For example, an electric current to the bearing depends on an output voltage of the two-level inverter and a sum of impedances of wiring wires that connect the reactor, the inverter, and the synchronous machine 10. Therefore, it is desirable that the length of a wiring wire that connects the two-level inverter 210 and the synchronous machine 10 and the length of a stator winding wire that connects the two-level inverter 220 and the synchronous machine 10 are substantially equal.

In particular, when the reactors 240 and 250 are reactors including iron cores, large stray capacitance is present between stator winding wires of the reactors and the iron cores. Therefore, a difference between wiring wire lengths given to bearing currents cannot be ignored. To target a bearing current suppression effect equal to or higher than 50%, it is desirable to limit a ratio of wiring wire lengths to a value smaller than 1:2, for example, 1:1.5.

As explained above, according to this embodiment, it is possible to offset bearing currents of the synchronous machine 10 flowing from the inverters 210 and 220. Therefore, it is possible to prevent electrical corrosion of the bearing.

In this embodiment, the synchronous machine is assumed as the rotary machine. However, an induction machine may be used instead of the synchronous machine. To form the gate signal, the gate signal is calculated according to the magnitude comparison with the carrier. However, for example, the gate signal may be calculated according to spatial vector modulation. When the spatial vector modulation is carried out, a selection order of voltage vectors in one switching cycle is reversed in the two-level inverters 210 and 220. Consequently, it is possible to obtain effects same as the effects in this embodiment.

In the explanation of this embodiment, the two inverters including the common direct-current circuit are provided. However, the same electrical corrosion suppression effect can be obtained as long as the rotary machine is a rotary machine including N pairs of inverters having inverted zero-phase voltage phases and including a common direct-current circuit and N sets of three-phase stator winding wires, electric angles of which are different by 180 degrees.

In this embodiment, the rotary machine is the bipolar machine. However, the same effects can be obtained even when the poles of the rotary machine are increased to four poles, six poles, or the like.

In this embodiment, the rotary machine adopts short-pitch winding. However, the same effects can be obtained even when the rotary machine adopts full-pitch winding.

Second Embodiment

A second embodiment according to the present invention is explained with reference to FIG. 8. In this embodiment, components same as the components in the first embodiment are denoted by the same reference numerals and signs and redundant explanation of the components is omitted. This embodiment is different from the first embodiment in that inverters are three-level inverters 230 and 240 rather than the two-level inverters 210 and 220.

Since the inverters are the three-level inverters 230 and 240, in addition to the effect of reducing a bearing current same as that in the first embodiment, it is possible to offset a ripple current flowing into an inverter direct-current circuit and avoid direct-current neutral point voltage fluctuation peculiar to three-level inverters. Consequently, it is possible to reduce a necessary capacity of a direct-current capacitor. As a result, it is possible to provide a more inexpensive rotary machine drive system that can avoid deficiencies due to electrical corrosion.

This embodiment is explained below with reference to the drawings. A rotary machine drive system 2 according to the second embodiment of the present invention is shown in FIG. 8.

An inverter system 21 of the rotary machine drive system 2 includes two three-level inverters 230 and 240. A series circuit of two direct-current capacitors 400P and 400N having an equal capacity is connected to a direct-current circuit that connects a rectifier 310 and the inverters 230 and 240. Both side terminals and a connecting section terminal of the series circuit of the capacitors 400P and 400N are respectively connected to direct-current terminals P and N and M of the three-level inverters 230 and 240 as shown in the figure.

In this case, a voltage between the both side terminals of the series circuit of the capacitors 400P and 400N is vdc and a direct current flowing to the connecting section terminal of the series circuit of the capacitors 400P and 400N is iM. The direct current iM flowing to a neutral point is split to the inverters 230 and 240. In FIG. 8, the split currents are represented as iMabc and iMxyz.

The controller 101 calculates gate signals G-ABC and G-XYZ for controlling the three-level inverters 230 and 240. Whereas the number of gate signals per one inverter described in the first embodiment is six, the number of gate signals is twelve in this embodiment.

Figure 9:
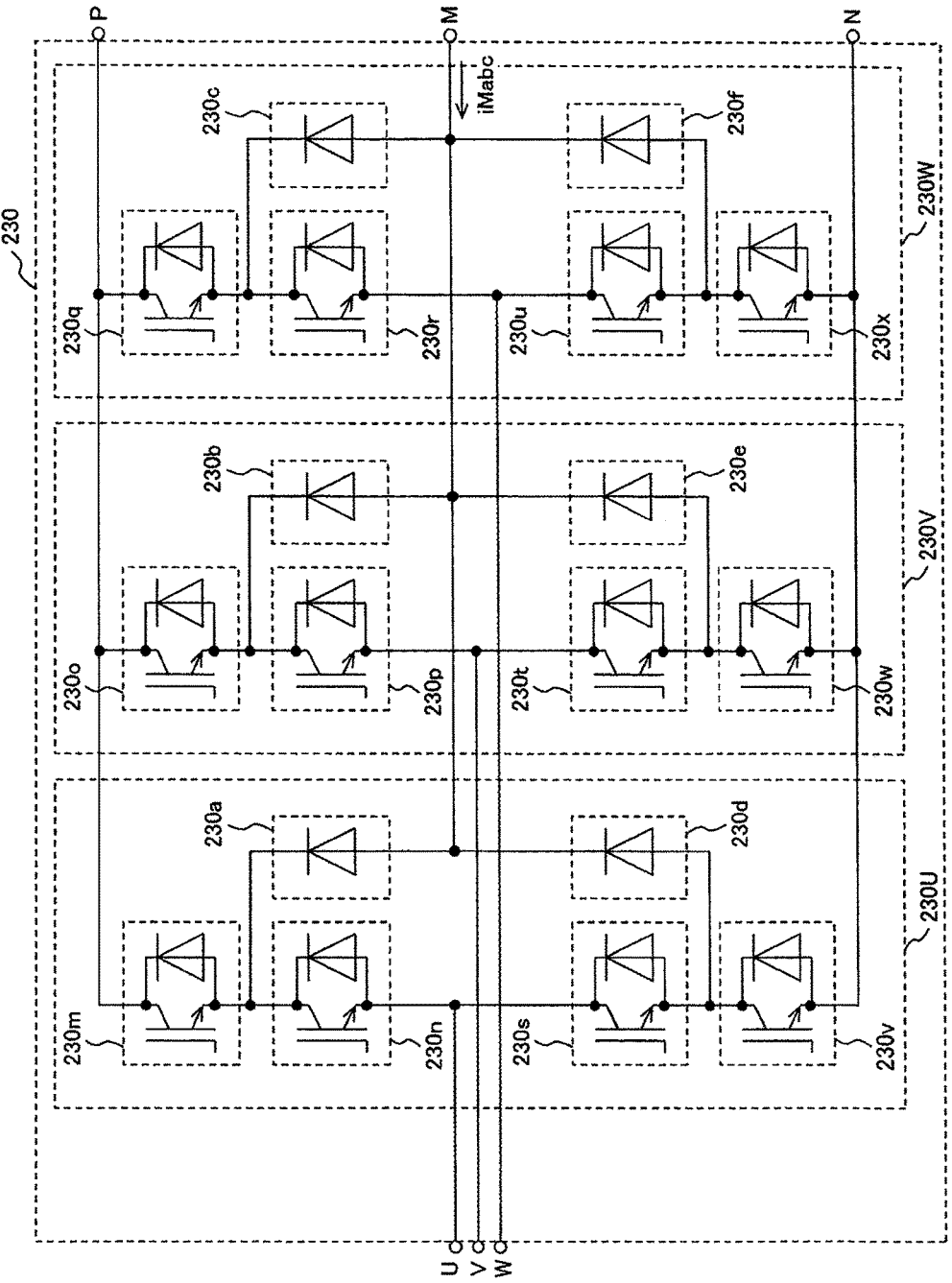
FIG. 9 is a diagram showing the configuration of a three-level inverter 230 shown in FIG. 8.

The configuration of the three-level inverter 230 is explained as an example with reference to FIG. 9. Since the three-level inverter 240 has a configuration same as the configuration of the three-level inverter 230, explanation of the three-level inverter 240 is omitted.

The three-level inverter 230 is an inverter including three arms for respective alternating current side terminals. Each of the arms includes four IGBT elements connected in series and two diodes connected to a terminal M at a direct-current neutral point.

In the figure, the arm connected to a U-phase alternating-current terminal is 230U, the arm connected to a V-phase alternating-current terminal is 230V, and the arm connected to a W-phase alternating-current terminal is 230W. The configurations of the arms are basically the same. Therefore, the arm 230U is explained as an example.

Four IGBT elements (230m, 230n, 230s, and 230v) are connected to the arm 230U in series. Both ends of a row of the four IGBT elements connected in series are respectively connected to a positive terminal P and a negative terminal N of the series circuit. In the example shown in the figure, a cathode side of the IGBT element 230m is connected to the positive terminal P of the series circuit and an emitter side of the IGBT element 230v is connected to the negative terminal N of the series circuit. Each of the IGBT elements includes an IGBT and a diode connected to the IGBT in anti-parallel.

The series arm including the four IGBT elements connected in series configures an upper arm with the two IGBT elements 230m and 230n on the upper side and configures a lower arm with the two IGBT elements 230s and 230v on the lower side. A connection point of the upper and lower arms is connected to the U-phase alternating-current terminal.

A series circuit of diodes 230a and 230d is connected between a connection point of the two IGBT elements 230m and 230n of the upper arm of the series arm and a connection point of the two IGBT elements 230s and 230v of the lower arm of the series arm. A connection point of the series circuit of the diodes 230a and 230d is connected to a direct-current terminal M. As shown in FIG. 8, the direct-current terminal M is a connecting section of the series circuit of the two direct-current capacitors 400P and 400N having an equal capacity.

Although not explained, the other arms 230V and 230W are configured the same as the arm 230U. In such a configuration, a branched current iMabc of the direct current iM flows in from the direct-current terminal M of the three-level inverter 230. The branched current iMabc branches to the respective arms. A sum of output currents of the arms, alternating-current output voltages of which are the same potential as the direct-current terminal M, is iMabc.

The IGBT elements of the three-level inverter 230 having such a configuration are driven by inputting a gate signal, which is output from the controller 101, to gate terminals, which are control electrodes, of the IGBT elements. A specific control method for the IGBT elements is explained with reference to the arm 230U as an example.

The gate signal G is output in the following three patterns.
Pattern 1: The IGBT elements 230m and 230n are on and the IGBT elements 230s and 230v are off.
Pattern 2: The IGBT elements 230n and 230s are on and the IGBT elements 230m and 230v are off.
Pattern 3: The IGBT elements 230s and 230v are on and the IGBT elements 230m and 230n are off.

In the case of the pattern 1, the alternating-current terminal U has the potential of the positive terminal P of the series circuit. In the case of the pattern 2, the alternating-current terminal U has the potential of an intermediate terminal M of the series circuit. In the case of the pattern 3, the alternating-current terminal U has the potential of the negative terminal N of the series circuit. Therefore, three voltages of +Vdc/2, 0, and −Vdc/2 can be output in terms of direct-current mid-point potential. This relation is the same in the other alternating-current terminals.

Figure 8:
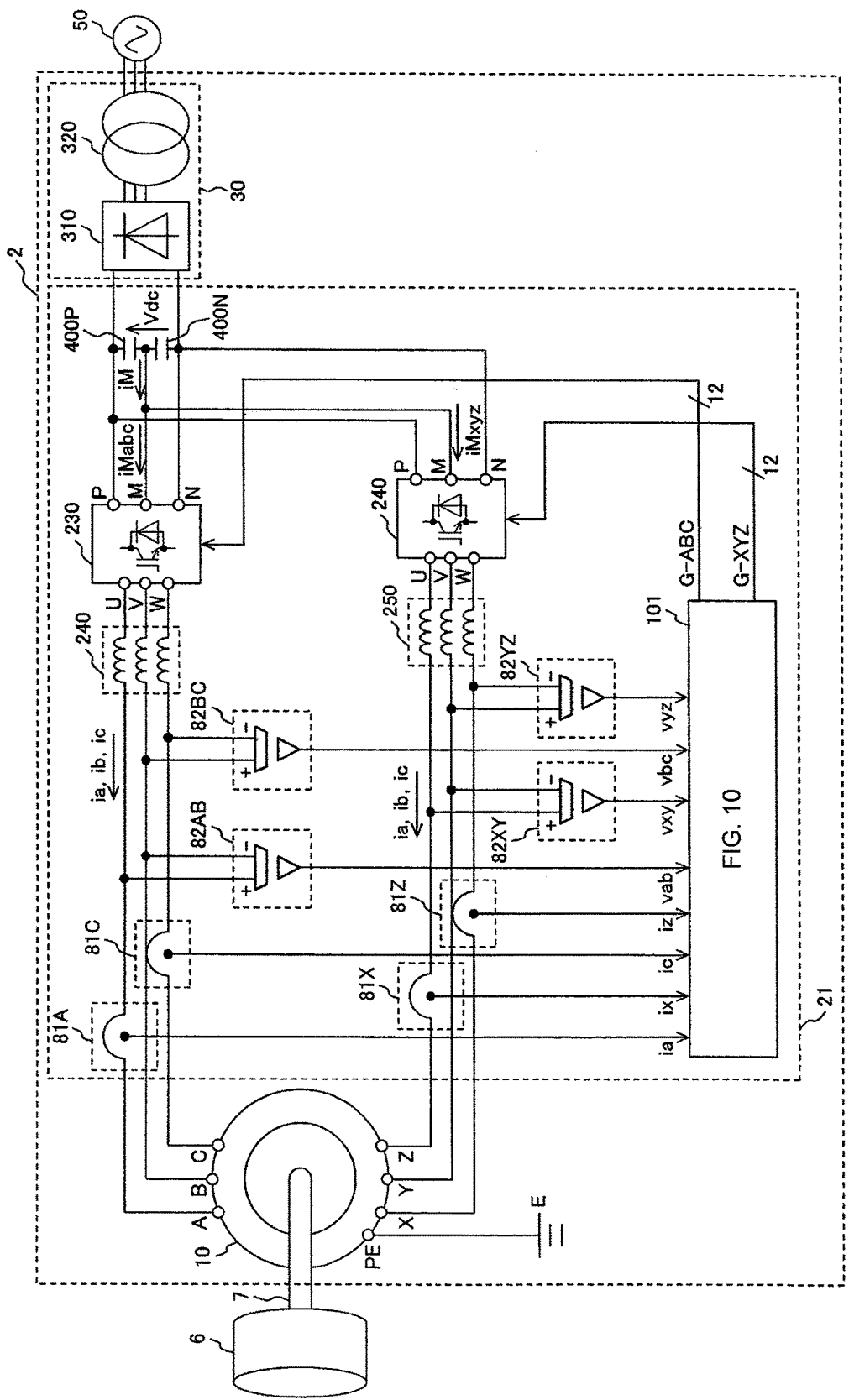
FIG. 8 is a diagram showing an overall configuration of a rotary machine drive system according to a second embodiment of the present invention.
Figure 10:
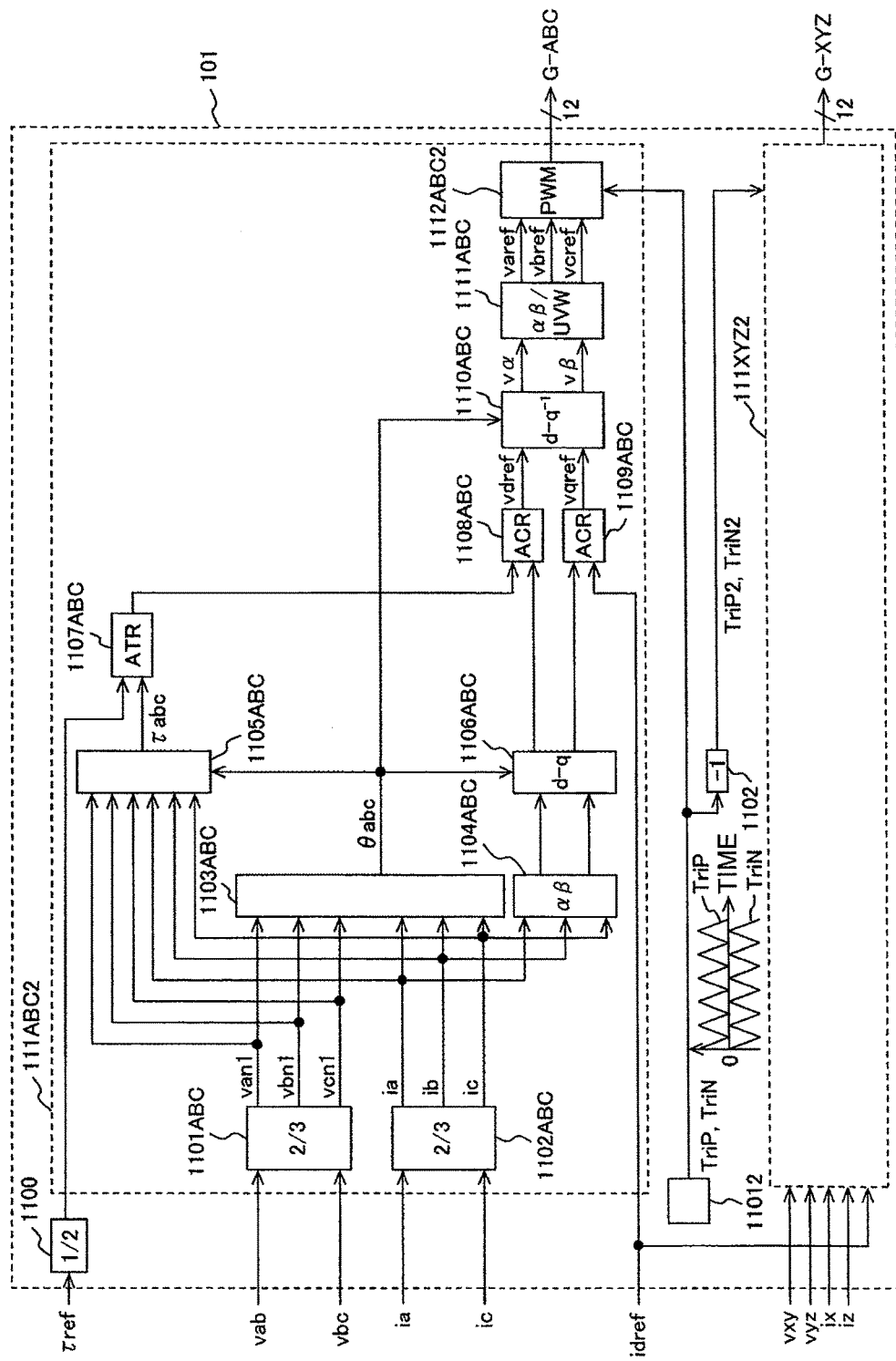
FIG. 10 is a diagram showing the configuration of a three-level inverter controller shown in FIG. 8.

The gate signal G is calculated by the controller 101 shown in FIG. 8. In FIG. 10, the configuration of the controller 101 is shown. The controller 101 is different from the controller 100 in the first embodiment in that a carrier generator 11012 is provided instead of the carrier generator 1101 and the carrier generator 11012 outputs two triangular waves TriP and TriN and in that a controller 111ABC2 includes a PWM operator 1112ABC2 configured to calculate a gate signal using the two triangular waves. PWM operators in the controller 111ABC2 and a controller 111XYZ2 have equivalent configurations.

The triangular waves TriP and TriN given to the PWM operator 1112ABC2 are triangular waves, phases and amplitudes of which are equal and direct-current biases of which are different. According to the direct current biases, the triangular wave TriN is set to be 0 at a point when the triangular wave TriP is a maximum value T and the triangular wave TriN is set to be a negative maximum value (−T) at a point when the triangular wave TriP is a minimum value 0. Consequently, the gate signal G-ABC is calculated using carriers from the controller 111ABC2.

Triangular waves TriP2 and TriN2 obtained by inverting the phase of the TriP and TriN as in the first embodiment are input to the controller 111XYZ2 as carriers. The controller 111XYZ2 calculates the gate signal G-XYZ using the carries.

Triangular waves TriP2 and TriN2 given to the controller 111XYZ2 side are also triangular waves, phases and amplitudes of which are equal and direct-current biases of which are different. The triangular waves TriP2 and TriN2 are obtained by phase-inverting the triangular waves TriP and TriN given to the controller 111ABC2 side using the multiplier 1102. Consequently, the triangular wave TriP is set to be 0 at a point when the triangular wave TriN is the maximum value T and the triangular wave TriP is set to be a negative maximum value (−T) at a point when the triangular wave TriN is a minimum value 0. Consequently, the gate signal G-XYZ is calculated using the carries from the controller 111XYZ2.

Waveforms of the difference voltages VN1 and NV2, which are neutral point potentials, of the synchronous machine 10 obtained when the three-level inverters 240 and 250 are used are explained with reference to FIG. 11.

Figure 11:
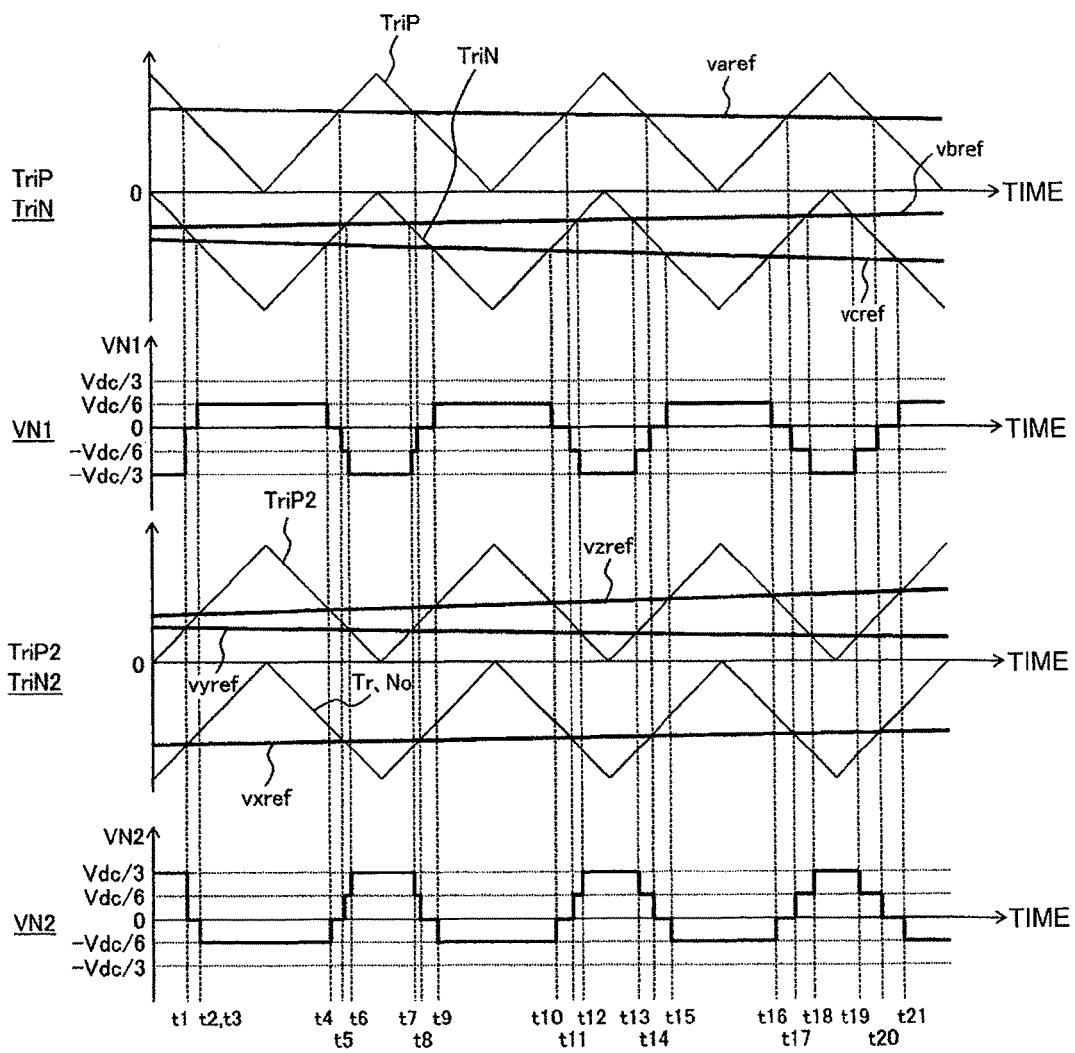
FIG. 11 is a diagram showing waveforms of difference voltages VN1 and VN2 obtained by the three-level inverter.

In FIG. 11, a relation between the carriers TriP and TriN of the three-level inverter 230 and the voltage command values Varef, Vbref, and Vcref is shown in the top section. A change in the difference voltage VN1 caused by the control is shown in the next section. A relation between the carries TriP2 and TriN2 of the third-level inverter 240 and voltage command values Vxref, Vyref, and Vzref is shown in the third section. A change in the difference voltage VN1 caused by the control is shown in the fourth section. The abscissa of FIG. 11 indicates time. Times t1 to t21 indicate times of timings when the carriers and the voltage command values cross.

As in the first embodiment, the voltage command values of the three-level inverters 230 and 240 are positive-negative symmetrical waveforms. The phases of the carriers TriP and TriN and the carriers. TriP2 and TriN2 are different by 180 degrees. Therefore, in this embodiment, as in the first embodiment, changing timings of the difference voltages VN1 and VN2 coincide with each other and changing directions of the difference voltages VN1 and VN2 are opposite. However, base potentials of the difference voltages VN1 and VN2 are different. This is because FIG. 11 indicates only a certain phase cross section. The base potentials change according to a voltage command value fundamental wave phase. However, the changing timings of the difference voltages VN1 and VN2 always coincide with each other and the changing directions of the difference voltages VN1 and VN2 are always opposite.

As a result, the phases of bearing currents respectively flowing out from the inverters 230 and 240 are inverted, as in the first embodiment, an electric current flowing to the bearing is substantially offset.

An effect of reducing a ripple current flowing into the inverter direct-current circuit, which is a further advantage of this embodiment, is explained with reference to FIG. 12. Definition of the current is shown in FIG. 8.

Figure 12:
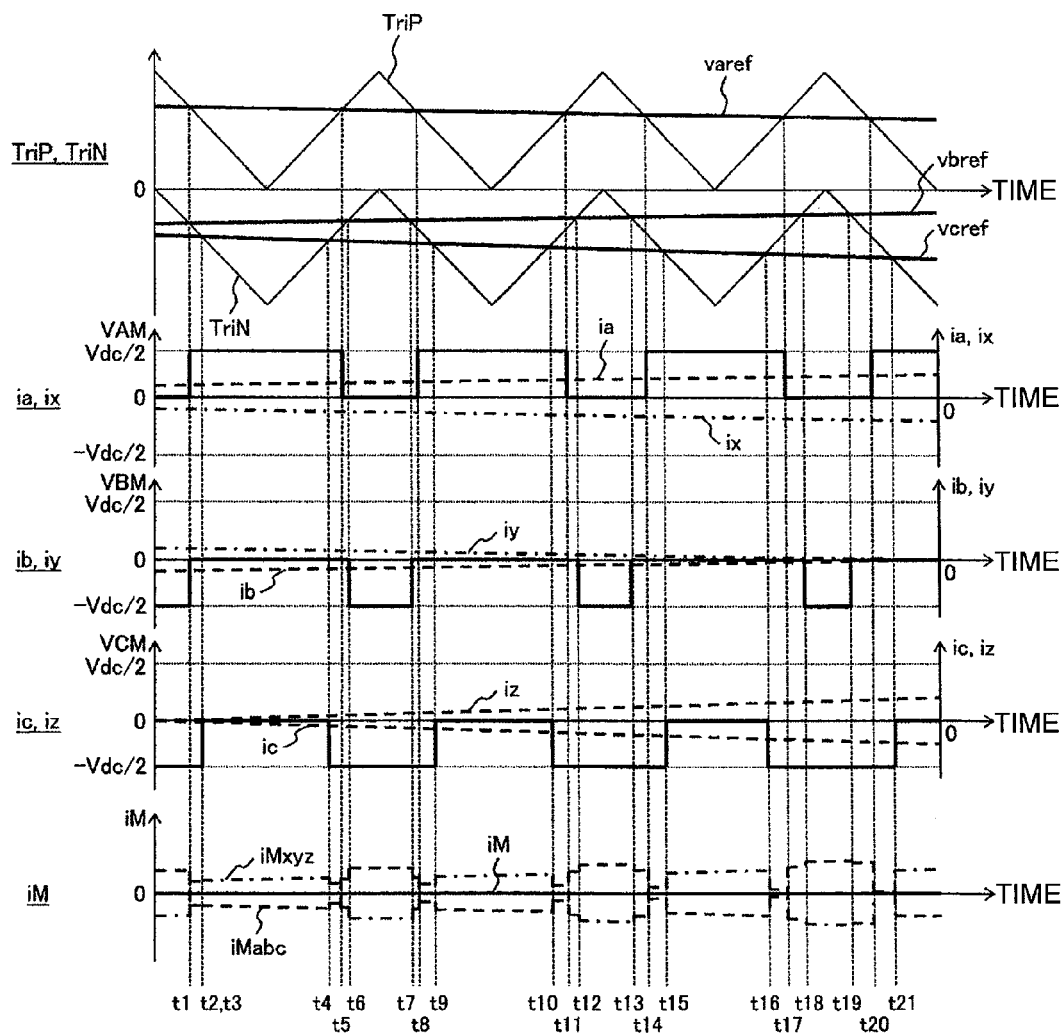
FIG. 12 is a diagram for explaining an effect of reducing a ripple current flowing into an inverter direct-current circuit.

A graph shown in FIG. 12 shows, in order from the above, a relation between the carriers and the voltage command values of the three-level inverter 230, a relation between an A-phase output voltage waveform and the A-phase current ia and the X-phase current ix of the synchronous machine 10, a relation between a B-phase output voltage waveform and the B-phase current ib and the Y-phase current iy, and a relation between a C-phase output voltage waveform and the C-phase current ic and the Z-phase current iz. Waveforms of the inflow current iMabc from the direct-current circuit terminal M of the inverter 230, the inflow current iMxyz from the direct-current circuit terminal M of the inverter 240, and the total current iM of the inflow current iMabc and the inflow current iMxyz are shown in the bottom section.

As explained in the first embodiment, in the A, B, and C phase currents and the X, Y, and Z phase currents, phases are different by 180 degrees. Therefore, ia and ix, ib and iy, and ic and iz are positive-negative symmetry each other.

As shown in FIG. 11, the switching timings for the three-level inverters 230 and 240 are equal. Therefore, changing timings of the direct-current neutral point currents iMabc and iMxyz also coincide with each other.

Therefore, waveforms of iMabc and iMxyz are positive-negative symmetry and the total current iM of iMabc and iMxyz is offset to be zero.

Here, iM is a ripple current flowing into the direct-current circuit. The current iM causes imbalance of terminal voltages of the direct-current capacitors 400P and 400N. However, in this embodiment, it is possible to offset the current iM that causes the imbalance of the terminal voltages. Therefore, it is possible to reduce the capacity of the direct-current capacitor necessary for stabilizing a direct-current voltage.

According to this embodiment, since the inverters are the three-level inverters, in addition to the effect of reducing a bearing current same as that in the first embodiment, it is possible to offset a ripple current flowing into the inverter direct-current circuit and avoid direct-current neutral point voltage fluctuation peculiar to the three-level inverters. Consequently, it is possible to reduce a necessary capacity of the direct-current capacitor. As a result, it is possible to provide a more inexpensive rotary machine drive system that can avoid deficiencies due to electrical corrosion.

Figure 13:
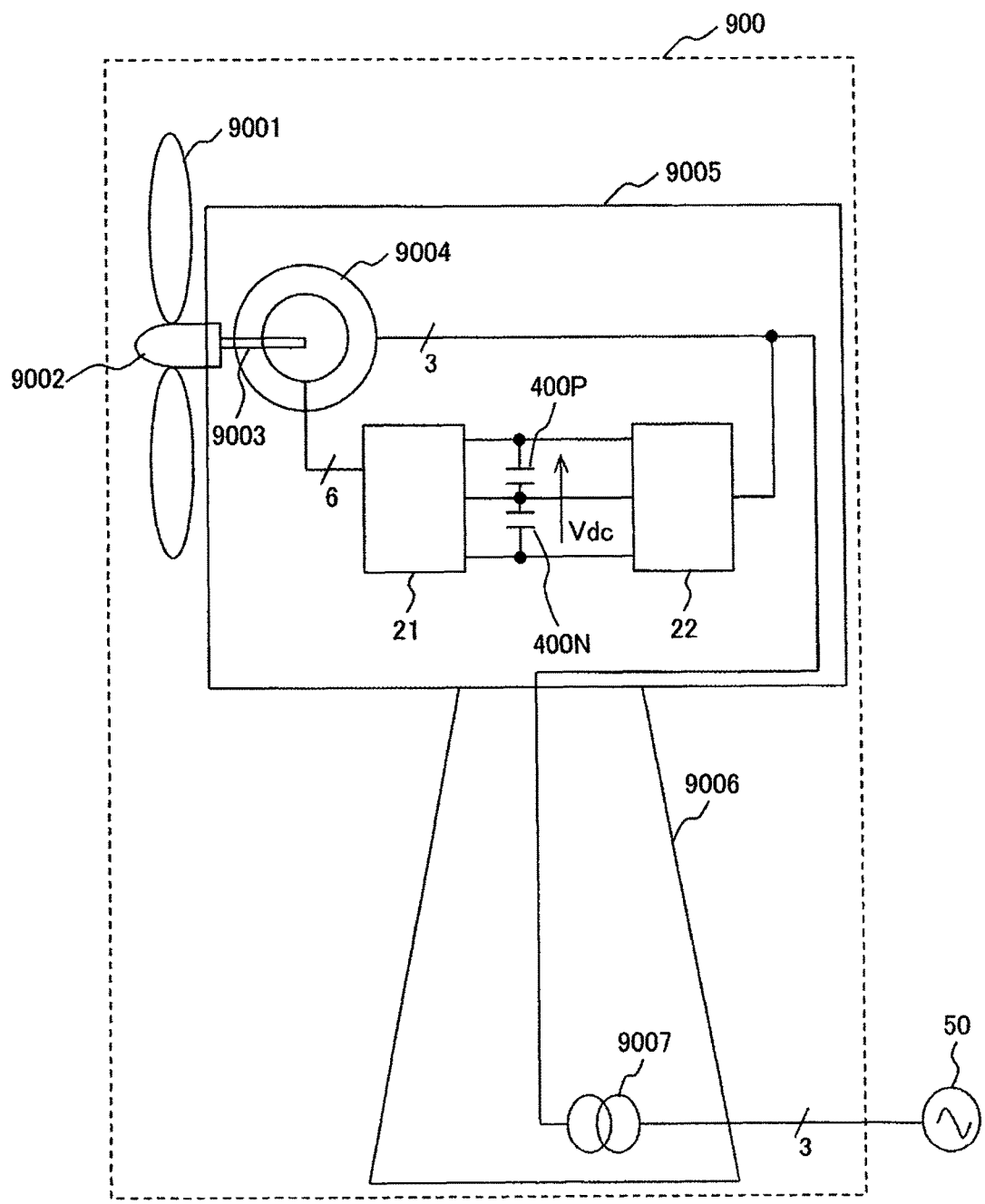
FIG. 13 is a diagram showing an example of a configuration in which the present invention is applied to a wind turbine generator system.

In the example of the rotary machine drive system shown in FIGS. 1 and 8, the configuration of the drive system for the synchronous electric motor that functions as the rotary machine and applies torque to the load 6 is explained. However, the rotary machine drive system may be a rotary machine drive system in a wind turbine generator system configured by adopting, for example, an induction generator as the rotary machine as shown in FIG. 13. In the rotary machine drive system, since power generation directions are changed, maintenance of a direct-current circuit voltage is realized not by the rectifier 30 but by a three-level converter 22 having a direct-current voltage maintenance function and enabling power interchange in both directions. As an example of the three-level converter 22, a three-level converter shown in FIG. 9 can be used.

A wind turbine generator system shown in FIG. 13 is an alternating-current excitation power generation system including a secondary excitation induction generator. An alternating-current excitation generator 9004 obtains rotation torque from wind using a blade 9001 and rotates a rotor of a generator via a hub 9002 and a shaft 9003. The generator and an inverter are provided in a nacelle 9005. A stator winding wire of the generator is connected to a linkage transformer 9007 via a wire. Generated power is transmitted to the power system 50 via the transformer 9007.

As the inverter system 21 in this example, an inverter system including the configuration shown in FIG. 9 and configured to perform the control shown in FIG. 10 can be used. The inverter system 21 feeds a low-frequency excitation current having a slip frequency such that a frequency of a rotating magnetic flux caused in a stator by a generator rotor coincides with a frequency of the power system 50.

When a power generation system includes the inverter system 21 in this embodiment and rotor stator winding wires of the alternating-current excitation generator are converted into six phases, large imbalance does not occur in terminal voltages of the direct-current capacitors 400P and 400P even if a low-frequency excitation current is output. Therefore, it is possible to attain a reduction in costs of the power generation system.

Figure 14:
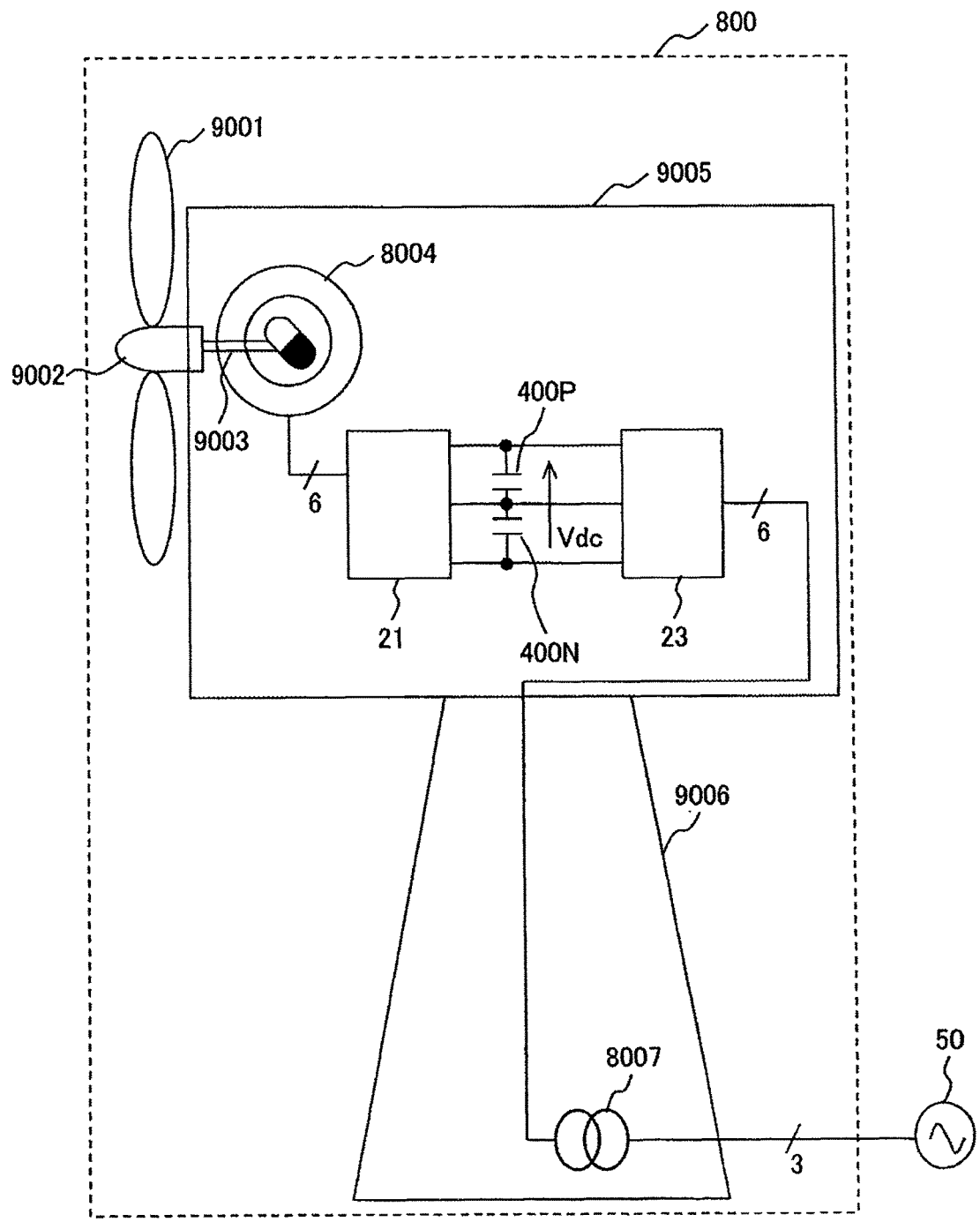
FIG. 14 is a diagram showing another example of the configuration in which the present invention is applied to the wind turbine generator system.

As shown in FIG. 14, the inverter system 21 in this embodiment may be used as an inverter for full-converter type wind turbine generation equipment. In this example, a permanent magnet is set in the generator shaft 9003. A rotating magnetic flux is generated in a stator according to the rotation of the permanent magnet to generate power. In this case, a three-level converter 23 may be a six-phase converter including a main circuit configuration same as the main circuit configuration of the inverter system 21.

Figure 15:
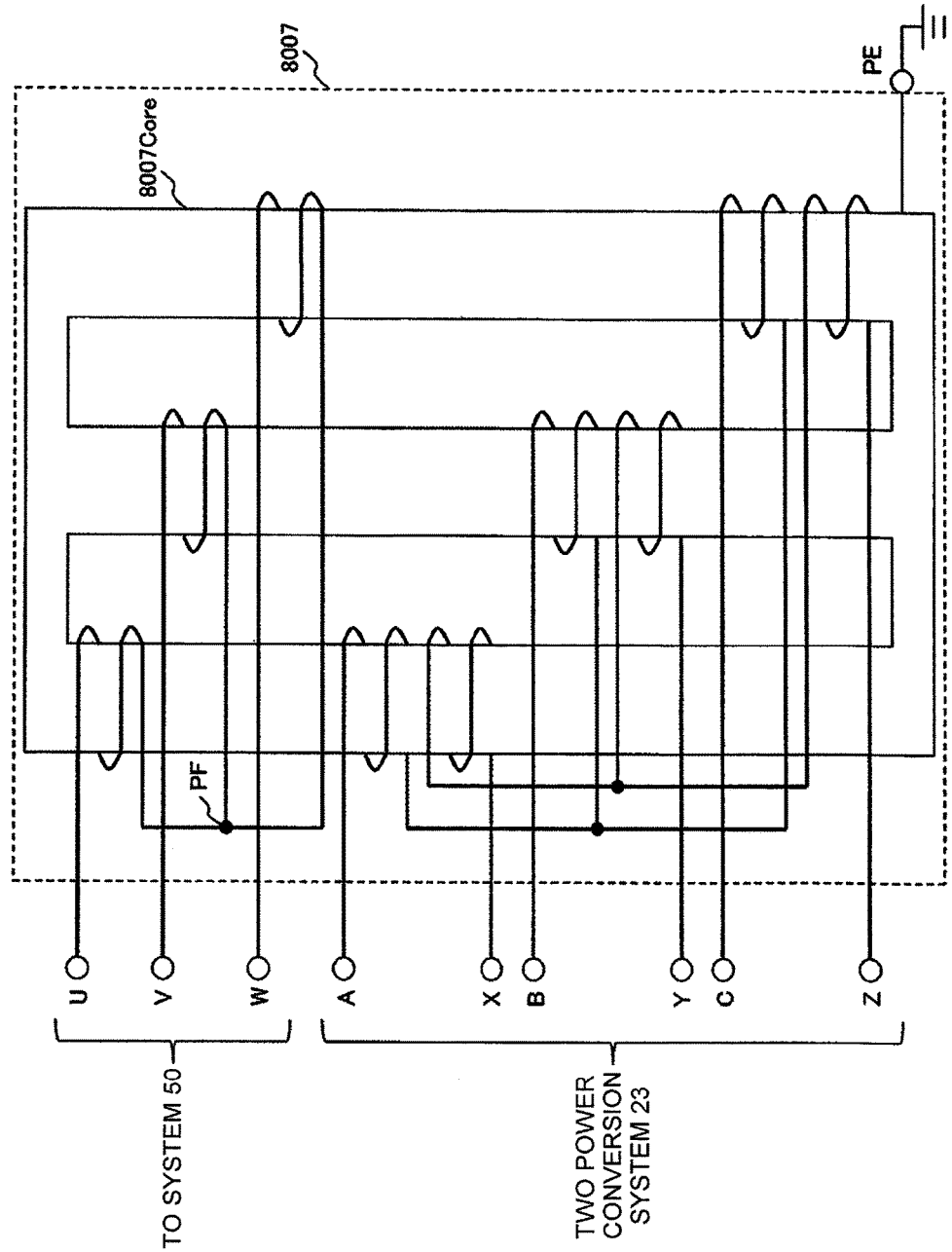
FIG. 15 is a diagram showing an example of the configuration of a linkage transformer.

Further, a linkage transformer 8007 includes, as shown in FIG. 15, six secondary stator winding wire terminals A, B, C, X, Y, and Z and three-phase stator winding wires U, V, and W having different neutral points PF. The six secondary stator winding wire terminals A, B, C, X, Y, and Z are connected to the power conversion system 23 side. The three-phase stator winding wires U, V, and W having different neutral points are connected to the power system 50 side. Usually, a core of a transformer is grounded to the earth via the power earth terminal PE. By adopting the transformer and the converter having this configuration, it is possible to prevent electrical corrosion in the earth terminal.

What is claimed is:

1. A drive system for a rotary machine comprising:
    a rotary machine including two sets of three-phase stator winding wires; and
    two sets of inverters connected to a same direct-current power supply,
    alternating-current terminals of the two sets of inverters being respectively connected to the three-phase stator winding wires of the sets, wherein
    in the rotary machine,
        stator winding wires are housed in a plurality of slots to form a stator,
        the two sets of three-phase stator winding wires are provided and the stator winding wires in a same phase of the sets are started to be wound from slot positions, phases of electric angles of which are different from each other by 180 degrees, among the plurality of slots and finished being wound in slot positions, phases of electric angles of which are different from each other by 180 degrees,
        winding end points of the three-phase stator winding wires of the sets are respectively connected in common, and
        alternating-current voltages having a same magnitude and opposite phases are applied to the two sets of three-phase stator winding wires by the inverters,
    wherein each of the inverters is controlled by a PWM comparing voltage command values with a corresponding carrier,
    wherein the carrier of one of the inverters is phase-inverted for the carrier of other of the inverters, and
    wherein the voltage command value of said one of the inverters is positive-negative inverted for the voltage command values of the other of the inverters.

2. The drive system for the rotary machine according to claim 1, further comprising two sets of controllers configured to control the two sets of inverters, wherein the controllers control ignition timings for the inverters through PWM performed using carriers as carrier waves, and the carriers given to the controllers are phase-inverted carriers.

3. The drive system for the rotary machine according to claim 1, further comprising two sets of controllers configured to control the two sets of inverters, wherein the controllers control ignition timings for the inverters through spatial vector control of the inverters, and order of voltage vector patterns is reversed over one cycle of ignition switching for the inverters.

4. The drive system for the rotary machine according to claim 1, wherein lengths of wiring wires that connect the rotary machine and the two sets of inverters are substantially equal.

5. The drive system for the rotary machine according to claim 1, wherein the inverters are three-level inverters.

6. The drive system for the rotary machine according to claim 1, wherein, the inverters are connected to the rotary machine via reactors, and the reactors include iron cores.

7. The drive system for the rotary machine according to claim 1, wherein when the rotary machine is a generator, the direct-current power supply is second two sets of inverters, one of which is connected to an alternating-current power supply side and the other of which is connected to the two sets of inverters via a direct-current circuit, the direct-current circuit includes a series capacitor in a line thereof, the inverters configuring the two sets of inverters and the second two sets of inverters are connected to a connection point of the series capacitor and between positive and negative terminals of the direct-current circuit.

8. The drive system for the rotary machine according to claim 7, wherein the two sets of inverters configuring the second inverter are connected to the alternating-current power supply via a linkage transformer, and the linkage transformer includes an alternating-current power supply side stator winding wire wound around three legs and two sets of inverter side stator winding wires wound around the three legs and configuring the second inverter, a part of the legs of the linkage transformer being set in the drive system.

9. A drive system for a rotary machine comprising:

a rotary machine including two sets of three-phase stator winding wires; and two sets of inverters connected to a same direct-current power supply, alternating-current terminals of the two sets of inverters being respectively connected to the three-phase stator winding wires of the sets, wherein in the rotary machine, stator winding wires are housed in a plurality of slots to form a stator, the two sets of three-phase stator winding wires are provided and the stator winding wires in a same phase of the sets are started to be wound from slot positions, phases of electric angles of which are different from each other by 180 degrees, among the plurality of slots and finished being wound in slot positions, phases of electric angles of which are different from each other by 180 degrees, winding end points of the three-phase stator winding wires of the sets are respectively connected in common, and alternating-current voltages having a same magnitude and opposite phases are applied to the two sets of three-phase stator winding wires, wherein when the rotary machine is a generator, the direct-current power supply is second two sets of inverters, one of which is connected to an alternating-current power supply side and the other of which is connected to the two sets of inverters via a direct-current circuit, wherein the direct-current circuit includes a series capacitor in a line thereof, and wherein the inverters configuring the two sets of inverters and the second two sets of inverters are connected to a connection point of the series capacitor and between positive and negative terminals of the direct-current circuit.

10. The drive system for the rotary machine according to claim 9, wherein the two sets of inverters configuring the second inverter are connected to the alternating-current power supply via a linkage transformer, and the linkage transformer includes an alternating-current power supply side stator winding wire wound around three legs and two sets of inverter side stator winding wires wound around the three legs and configuring the second inverter, a part of the legs of the linkage transformer being set in the drive system.

11. The drive system for the rotary machine according to claim 9, further comprising two sets of controllers configured to control the two sets of inverters, wherein the controllers control ignition timings for the inverters through PWM performed using carriers as carrier waves, and the carriers given to the controllers are phase-inverted carriers.

12. The drive system for the rotary machine according to claim 9, further comprising two sets of controllers configured to control the two sets of inverters, wherein the controllers control ignition timings for the inverters through spatial vector control of the inverters, and order of voltage vector patterns is reversed over one cycle of ignition switching for the inverters.

13. The drive system for the rotary machine according to claim 9, wherein lengths of wiring wires that connect the rotary machine and the two sets of inverters are substantially equal.

14. The drive system for the rotary machine according to claim 9, wherein the inverters are three-level inverters.

15. The drive system for the rotary machine according to claim 9, wherein, the inverters are connected to the rotary machine via reactors, and the reactors include iron cores.

* * * * *